(12) United States Patent
Hazenbroek et al.

(10) Patent No.: US 10,952,445 B2
(45) Date of Patent: Mar. 23, 2021

(54) METHOD AND APPARATUS FOR CONTINUOUSLY HARVESTING SURROUNDING MEAT FROM A SUCCESSIVE PLURALITY ANIMAL LEGS

(71) Applicant: Foodmate B.V., Numansdorp (NL)

(72) Inventors: David Scott Hazenbroek, Numansdorp (NL); Dirk Cornelis Stooker, Numansdorp (NL); Juul Floris van den Berg, Numansdorp (NL)

(73) Assignee: Foodmate, B.V., Numansdorp (NL)

( * ) Notice: Subject to any disclaimer, the term of this patent is extended or adjusted under 35 U.S.C. 154(b) by 0 days.

(21) Appl. No.: 16/481,966

(22) PCT Filed: Jan. 30, 2018

(86) PCT No.: PCT/NL2018/050064
§ 371 (c)(1),
(2) Date: Jul. 30, 2019

(87) PCT Pub. No.: WO2018/143799
PCT Pub. Date: Aug. 9, 2018

(65) Prior Publication Data
US 2019/0387757 A1    Dec. 26, 2019

(30) Foreign Application Priority Data

Jan. 31, 2017    (NL) ...................................... 2018268

(51) Int. Cl.
*A22C 21/00*    (2006.01)
*A22B 7/00*    (2006.01)

(52) U.S. Cl.
CPC .......... *A22C 21/0023* (2013.01); *A22B 7/002* (2013.01); *A22C 21/0007* (2013.01); *A22C 21/0053* (2013.01)

(58) Field of Classification Search
CPC ........................... A22C 21/00; A22C 21/0023
(Continued)

(56) References Cited

U.S. PATENT DOCUMENTS

RE36,664 E * 4/2000 O'Brien ............... A22B 5/0005
452/149
6,563,904 B2 * 5/2003 Wijts ................. A22C 17/0086
378/58
(Continued)

FOREIGN PATENT DOCUMENTS

EP    2 532 246 A1    12/2012
EP    2 724 618 A1    4/2014
(Continued)

*Primary Examiner* — Richard T Price, Jr.
(74) *Attorney, Agent, or Firm* — Womble Bond Dickinson (US) LLP

(57) ABSTRACT

A method of, and an apparatus (1) for, continuously harvesting surrounding meat from a successive plurality animal legs having articulated first and second animal bones and an intermediate joint. The method continuously conveys the animal legs through a path of conveyance, and determines a location of the intermediate joint. Based on the determined location of the intermediate joint, adjusting a position of the intermediate joint and a cutting implement relative to one another, and performing cutting of tissue at a location commensurate with the location of the intermediate joint. The step of determining the location of the intermediate joint is performed contactless, and without interrupting continuous conveyance of the animal legs.

27 Claims, 21 Drawing Sheets

(58) Field of Classification Search
USPC .......................................................... 452/157
See application file for complete search history.

(56) References Cited

U.S. PATENT DOCUMENTS

| | | | |
|---|---|---|---|
| 7,918,718 B2* | 4/2011 | Christensen | A22B 5/007 |
| | | | 452/157 |
| 8,992,290 B2* | 3/2015 | Taniguchi | A22C 17/02 |
| | | | 452/135 |
| 2012/0190284 A1 | 7/2012 | Hazenbroek et al. | |

FOREIGN PATENT DOCUMENTS

| | | |
|---|---|---|
| EP | 2 827 134 A1 | 1/2015 |
| EP | 2 912 946 A1 | 9/2015 |
| WO | WO 2004/106020 A1 | 12/2004 |
| WO | WO 2015/114461 A1 | 8/2015 |

* cited by examiner

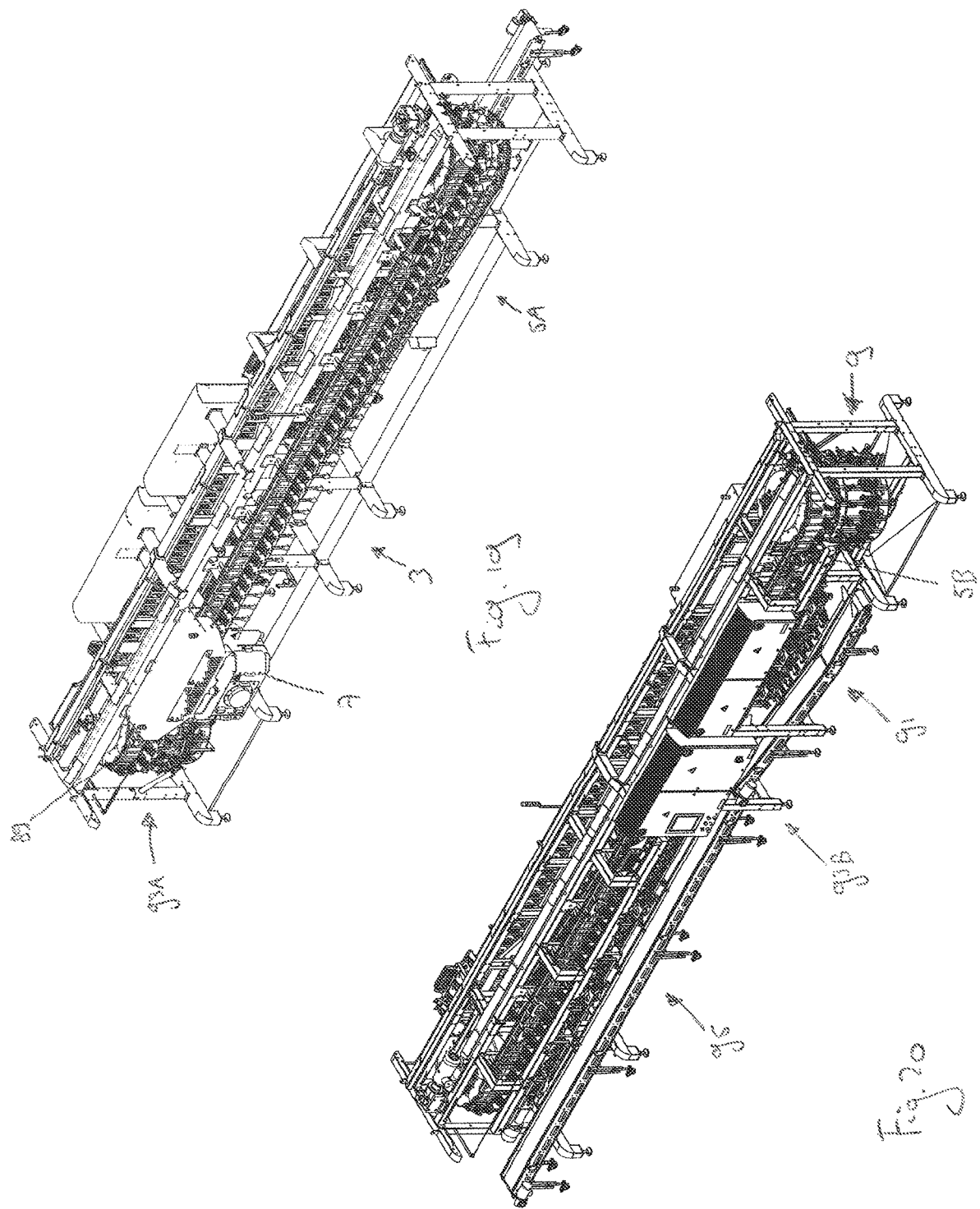

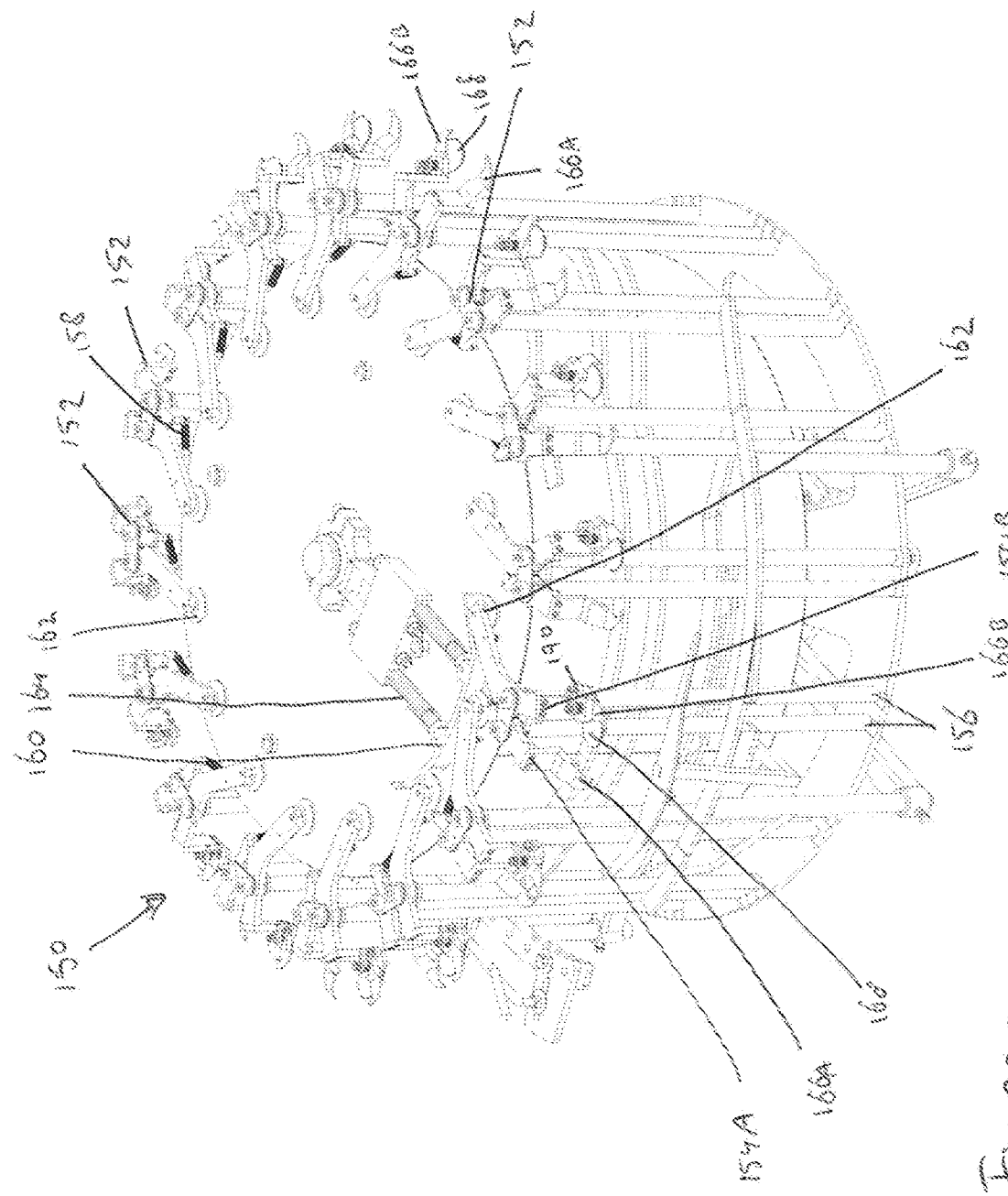

METHOD AND APPARATUS FOR CONTINUOUSLY HARVESTING SURROUNDING MEAT FROM A SUCCESSIVE PLURALITY ANIMAL LEGS

REFERENCE TO RELATED APPLICATIONS

This is a U.S. national stage application under 35 U.S.C. 371 of application PCT/NL2018/050064 filed on Jan. 30, 2018 and entitled Method and Apparatus for Continuously Harvesting Surrounding Meat From a Successive Plurality of Animal Legs, which claims priority to Netherlands patent application NL2018268 filed Jan. 31, 2017 and entitled Method and Apparatus for Continuously Harvesting Surrounding Meat From a Successive Plurality of Animal Legs.

FIELD OF THE INVENTION

The invention generally relates to harvesting surrounding meat from elongate first and second animal bones that are articulated by an intermediate joint. More in particular the invention involves, as part of such harvesting, detection of the position and extent of the first and second animal bones within the surrounding meat, so as the determine a position of the intermediate joint.

BACKGROUND TO THE INVENTION

As it is known that animal legs differ amongst each other, there has been demand to determine the length of each animal leg individually, and thereby obtain information about the location of an intermediate joint, such a s knee joint in a poultry leg. The methods and apparatuses developed thus far have been slightly cumbersome, in requiring the process to be interrupted or slowed down, and also in not always being fully accurate.

SUMMARY OF THE INVENTION

Accordingly it is an object of the present invention to propose, and embodiments of the present invention seek to provide, an improved method and apparatus for continuously harvesting surrounding meat from a successive plurality of animal legs. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative.

To this end the invention provides a method of, as well as a related apparatus for, continuously harvesting surrounding meat from a successive plurality of animal legs having articulated first and second animal bones and an intermediate joint as defined by one or more of the appended claims.

According to an aspect is provided a method of continuously harvesting surrounding meat from a successive plurality animal legs having articulated first and second animal bones and an intermediate joint. The method includes continuously conveying the animal legs through a path of conveyance. The method includes determining a location of the intermediate joint. The method includes based on the determined location of the intermediate joint, adjusting a position of the intermediate joint and a cutting implement relative to one another. The method includes performing cutting of tissue at a location commensurate with the location of the intermediate joint. The step of determining the location of the intermediate joint is performed without interrupting continuous conveyance of the animal legs. Determining the location of the intermediate joint and adjusting the position of the intermediate joint and the cutting implement relative to one another provides the advantage that the animal leg can be cut accurately in reference to the intermediate joint. Determining the location of the intermediate joint being without interrupting continuous conveyance of the animal legs provides the advantage that the meat harvesting process is not affected, e.g. not slowed down or no potential contamination is introduced.

Optionally, the determining of the location of the intermediate joint is performed contactless.

More in particular the invention can involve, as part of such harvesting, contactless detection of the position and extent of at least a part of the first and second animal bones within the surrounding meat, so as the locate an exact position of the intermediate joint.

Optionally, the contactless determining of the location of the intermediate joint is performed using electromagnetic radiation. Optionally, the electromagnetic radiation includes X-ray. Optionally, the contactless determining of the location of the intermediate joint is performed using ultrasound. Contactless sensing means to scan an animal part, such as a poultry leg including a knee joint, can comprise amongst others Nuclear Magnetic Resonance, X-ray, Magnetic Resonance Imaging (MRI), Computer Tomography (CT), Infrared Radiation, Visible Light, Ultraviolet Radiation, Radio Waves, Microwaves, and Ultrasound. The present invention will be explained by way of an example that uses X-ray. Thus when reference is made in this specification to "electromagnetic radiation" it is understood not to exclude any of the aforementioned, or other, alternatives.

Optionally, the position of the intermediate joint is adjusted to be aligned with the cutting implement. Optionally, the position of the cutting implement is adjusted to be aligned with the intermediate joint.

The position of the intermediate joint on an individual leg can be used as a reference position. All legs can be aligned, e.g. for cutting, with the reference positions of all legs adjusted to the same height position, e.g. relative to the cutting implement. It is also possible to define the reference position as a position along the length of the leg. The reference position can e.g. be chosen to be at 20% or 50% or 80% of the distance between the intermediate joint and a suspension point of the leg, or any other suitable position. The reference position can e.g. be chosen to be at 120% or 150% or 180% of the distance between the intermediate joint and the suspension point of the leg. The reference point on the legs to be aligned can be determined by the position of the intermediate joint and a length of the respective leg.

Optionally, the animal legs are continuously moved through a path of conveyance, and determining the location of the intermediate joint is performed while shielding the path of conveyance against electromagnetic radiation. The location of the intermediate joint can be determined at a part of the path of conveyance that is surrounded by a shielding to allow electromagnetic radiation to reach the animal leg within the shielding, while preventing the electromagnetic radiation from extending outside the shielding.

Optionally, continuous conveyance of the animal legs includes the animal legs each being suspended from a shackle that is moved through a path of conveyance by an overhead conveyor. Optionally, the shackles are aligned with one another at a common level prior to the step of contactless determining of the location of the intermediate joint.

Alternatively, determining the location of the intermediate joint is performed without prior alignment of the shackles at a common level. The location of the intermediate joint can be determined relative to an extremity of the animal leg. The location of the intermediate joint can be determined relative to a contact point of the leg with the shackle. The location of the intermediate joint can be determined relative to the shackle, e.g. taking into account information representative of a position of a contact point of the leg relative to the shackle at the moment of determining the location of the intermediate joint.

The level of each shackle can be adjusted individually based on the determined location of the intermediate joint to align all intermediate joints at a common level.

Optionally, prior to the step of, e.g. contactless, determining of the location of the intermediate joint the shackles are reset to a predetermined standard height to become aligned with one another at a common level. Optionally, the standard height is selected central in an adjustment range of the height adjustment of the shackle, e.g. in the middle.

Optionally, cutting of tissue at the location commensurate with the location of the intermediate joint includes gripping the surrounding meat, moving the suspended bone away from the gripped surrounding meat to tension and expose tissue for cutting.

Optionally, step of cutting tissue commensurate with the location of the intermediate joint is repeated on at least two surrounding sides of the animal leg.

According to an aspect is provided an apparatus arranged for performing the steps of the method.

According to an aspect is provided a cutting station for cutting meat on a poultry leg depending from a shackle, the cutting station being arranged for cutting the leg at a position adjustable in height relative to the shackle. The cutting station includes an inclined guide for guiding the shackle forwards and upwards or downwards. The cutting station further includes a motion unit for moving the knife in a, e.g. horizontal, forward and/or backward direction. Hence an intersection point between a trajectory of the leg depending from the shackle and a trajectory of the knife can be moved forwards and/or backwards, e.g. horizontally, which results in the leg being cut at a selectable height relative to the shackle. According to an aspect is provided a knuckle support unit. The knuckle support unit includes a plurality of knuckle supports. Each knuckle support includes a first arm and a second arm. The arms are movable relative to each other from an open to a closed position. The arms are movably, e.g. pivotally, mounted to a movable carrier, e.g. to a mobile, such as rotatable, frame. The arms may e.g. be pivotally attached to shafts of a rotatable J-cutter. The knuckle support unit further includes a guide. The guide is positioned to remain, e.g. angularly, fixed while the knuckle supports pass the guide. At least one of the arms includes a cam, such as a roller. The cam is arranged to contact the guide, such that upon contacting the cam, while the cam passes the guide, the guide moves the cam such that the arms are pivoted to the closed position. Each arm includes a respective gripper, arranged such that the grippers of a knuckle support together can grip an animal part, such as a poultry leg.

The knuckle support unit can be included in the apparatus as described hereinabove.

Optionally, motion, such as pivotal motion, of the two arms of a knuckle support is coupled, such that both arms open and close simultaneously. Optionally, thereto the arms include meshing gear teeth. Optionally, the arms are biased into an open, spread position, such as by a resilient element such as a spring.

Optionally, to at least one of the arms of a knuckle support a pressure plate is mounted. The pressure plate can be pivotally connected to the arm. The pressure plate can be biased, in use, towards an object held by the grippers. Optionally, the knuckle support thereto includes a resilient element, such as a spring.

Optionally, the guide is biased in its position, e.g. spring-loaded, such that if the cam exerts excessive force onto the guide, the guide will be moved out of position against the biasing force.

Optionally, the knuckle support unit is mounted to a J-cutter unit, for holding poultry legs, e.g. by a knuckle such as an ankle knuckle or knee knuckle. Optionally the knuckle support unit is mounted to a carrousel, e.g. a carrousel of a J-cutter unit.

Optionally, the grippers are aligned with a knife of the J-cutter unit, e.g. such that the grippers are straight above the knife. Hence, the knife always incises the leg at the desired position just behind the bone (and not touching the bone).

It will be appreciated that any of the aspects, features and options described in view of the methods apply equally to the apparatus and vice versa. It will also be clear that any one or more of the above aspects, features and options can be combined.

BRIEF DESCRIPTION OF THE DRAWINGS

The invention will further be elucidated on the basis of exemplary embodiments or examples which are represented in a drawing. The exemplary embodiments or examples are given by way of non-limitative illustration. It is noted that the figures are only schematic representations of embodiments or examples of the invention that are given by way of non-limiting example. In the drawing:

FIG. 19 is an overview showing a front side of a machine for harvesting meat from a poultry leg;

FIG. 20 is an overview showing a rear side of a machine for harvesting meat from a poultry leg;

FIG. 22A is a schematic view of a knuckle support unit; and

DETAILED DESCRIPTION

Figure 1:
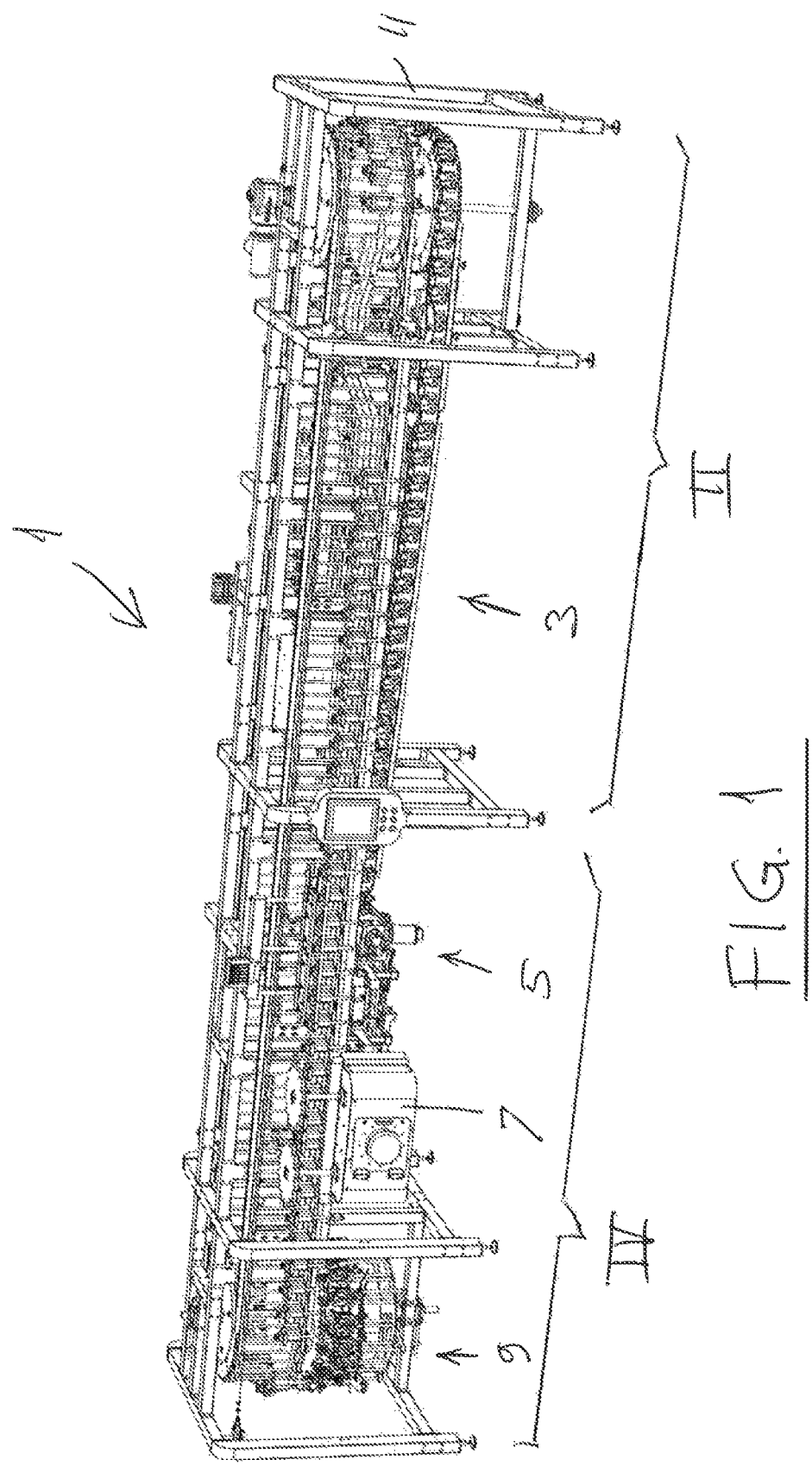
FIG. 1 is an overview showing a front side of a machine for harvesting meat from a poultry leg.

An example of a machine 1 for harvesting surrounding meat from articulated first and second poultry bones in accordance with the invention is shown in FIG. 1. The machine 1 in FIG. 1 is shown from a front side and a right hand part indicated by II includes a loading section 3, and a left hand side indicated by IV that includes a shackle level resetting station 5, an X-ray bone detection unit 7, and a J-cutter section 9. The right hand part II will be further explained in reference to FIG. 2 and the left hand part IV will be further explained in reference to FIG. 4.

Figure 2:
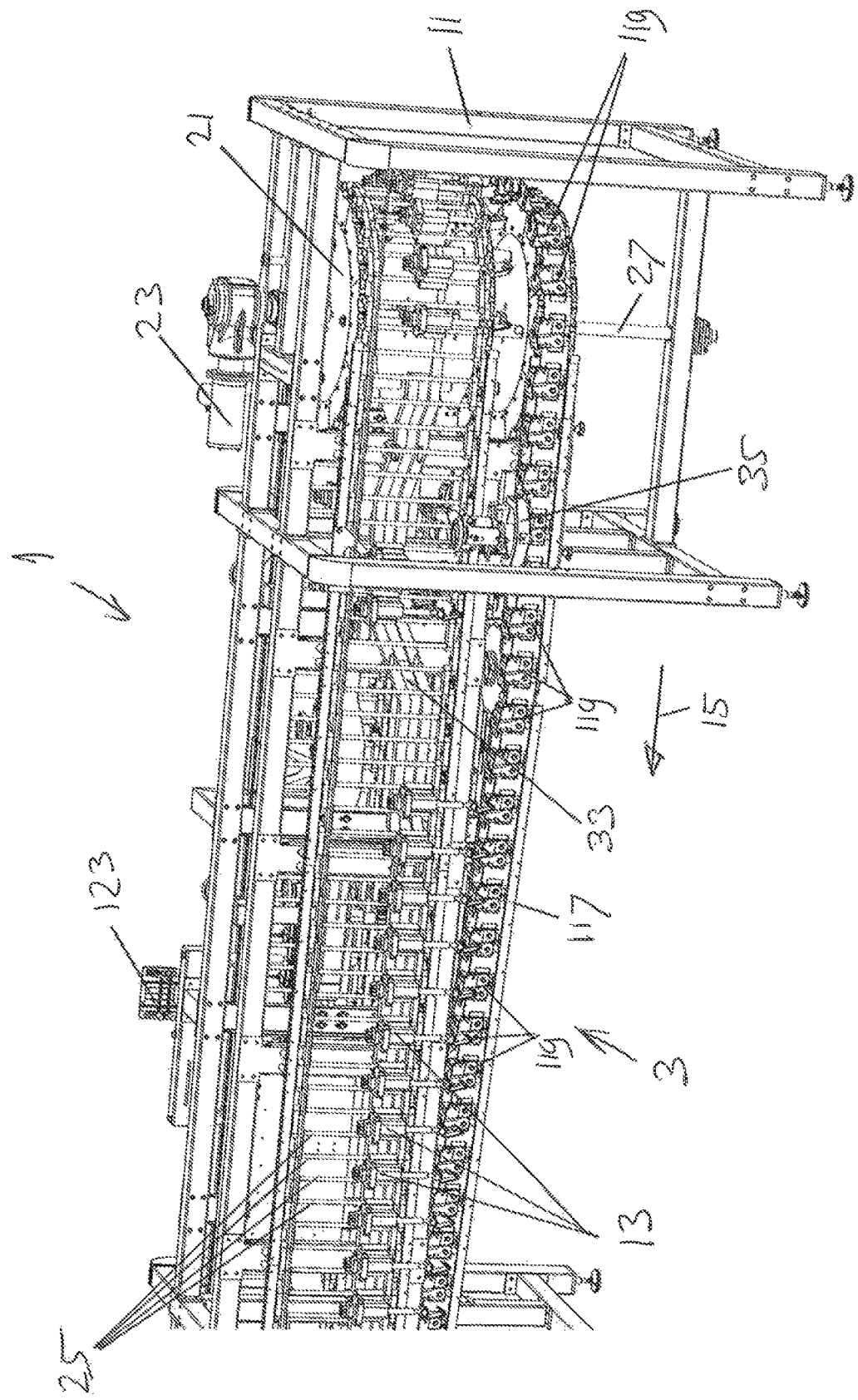
FIG. 2 is an enlarged detail view of the right hand part of FIG. 1 representing a loading section.

The machine 1 generally has a frame 11 that supports the various sections and units at a predetermined height above ground level. The loading section 3 as shown in FIG. 2 presents a succession of poultry leg suspension shackles 13, which are conveyed in a conveying direction 15. In this example, the shackles 13 are conveyed to one or more workers (not shown) who hang poultry legs into the individual shackles 13. It is possible that the machine 1 is arranged for processing either left or right legs. It is also possible that the machine is arranged for both left and right legs. In the latter case, the J-cutter section 9 can include cutter units for left legs and cutter units for right legs. The J-cutter section 9 can e.g. include alternately cutter units for left legs and cutter units for right legs.

Figure 3:
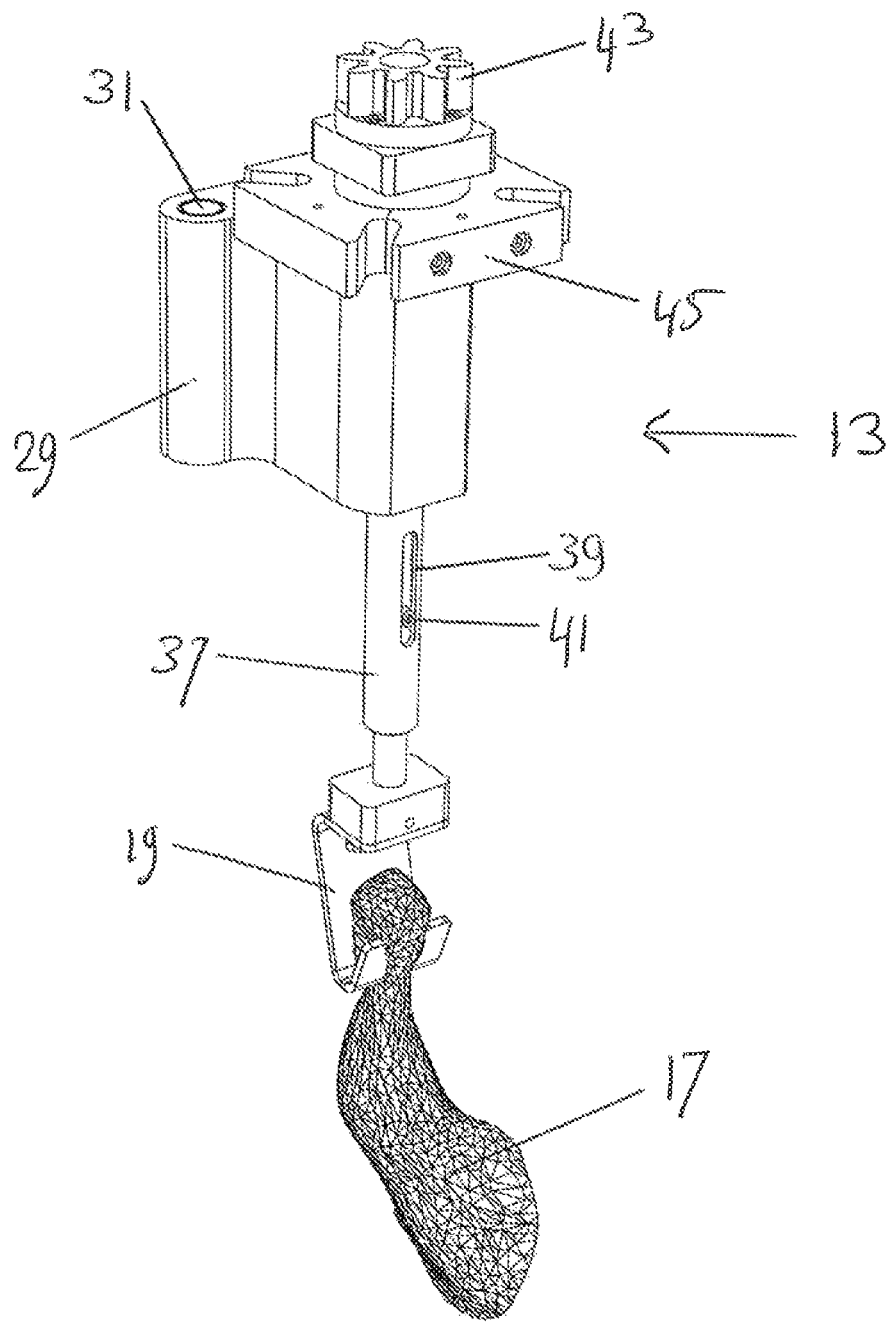
FIG. 3 is an individual poultry leg shackle shown with a poultry leg hanging therefrom.

As shown in FIG. 3 the poultry leg 17 is hung by its ankle joint or hock knuckle from a hook 19 of the shackle 13. As further seen in FIG. 2 the machine 1 has a driving carrousel 21, which is driven by an electric drive unit 23, and drives a conveyor chain. The driving carrousel 21 is rotatable about a vertical shaft 27. Here, the conveyor chain has a plurality of vertically extending bars 25. Adjacent pairs of vertical bars 25 receive a body part 29 of a shackle 13 (see FIG. 3) to allow vertical sliding movement of the body part 29 with respect to the vertical bars 25. Each bar 25 of a relevant pair is engaged in a respective bore 31 in the body part 29 of which only one is visible in FIG. 3. Each body part 29 of a shackle 13 is provided with a guide roller on its reversed side (not visible in FIG. 3, but conventional and shown in FIG. 8 with a numeral 87), which guide roller 87 engages a stationary control track 33 connected to the machine frame 11. As will be explained later on the driving carrousel 21 also performs the final stages of meat stripping, and upon passage of a last cutting station 35 the remaining bone of a previous meat harvesting operation will then be ejected from the hook 19 in a conventional manner, so that only empty hooks 19 are returned to and entering the loading section 3.

As further shown in FIG. 3 the shackle 13 has a telescoping shaft 37 in which the hook 19 is height adjustable within a range allowed by a vertical slot 39 in the telescoping shaft 37 and a transverse pin 41 associated with the hook 19 movable in the slot 39.

Vertical adjustment of the hook 19 with respect to the body part 29 is obtained by a screw-spindle mechanism (not shown, but conventional), which is driven by a pinion wheel 43 exposed at the top of the body part 29 of each shackle 13. Rotation of the pinion wheel 43 only lifts and lowers the hook 19. Rotation of the pinion wheel 43 does not rotate the hook 19. Also exposed on top of the body part 29 is a Maltese cross 45, which is fixedly connected to the telescoping shaft 37 to enable rotation of the hook 19 in 90 degree increments, when operated to do so. Such indexing means are well known in poultry processing machines and do not require a detailed description in the present context.

Figure 4:
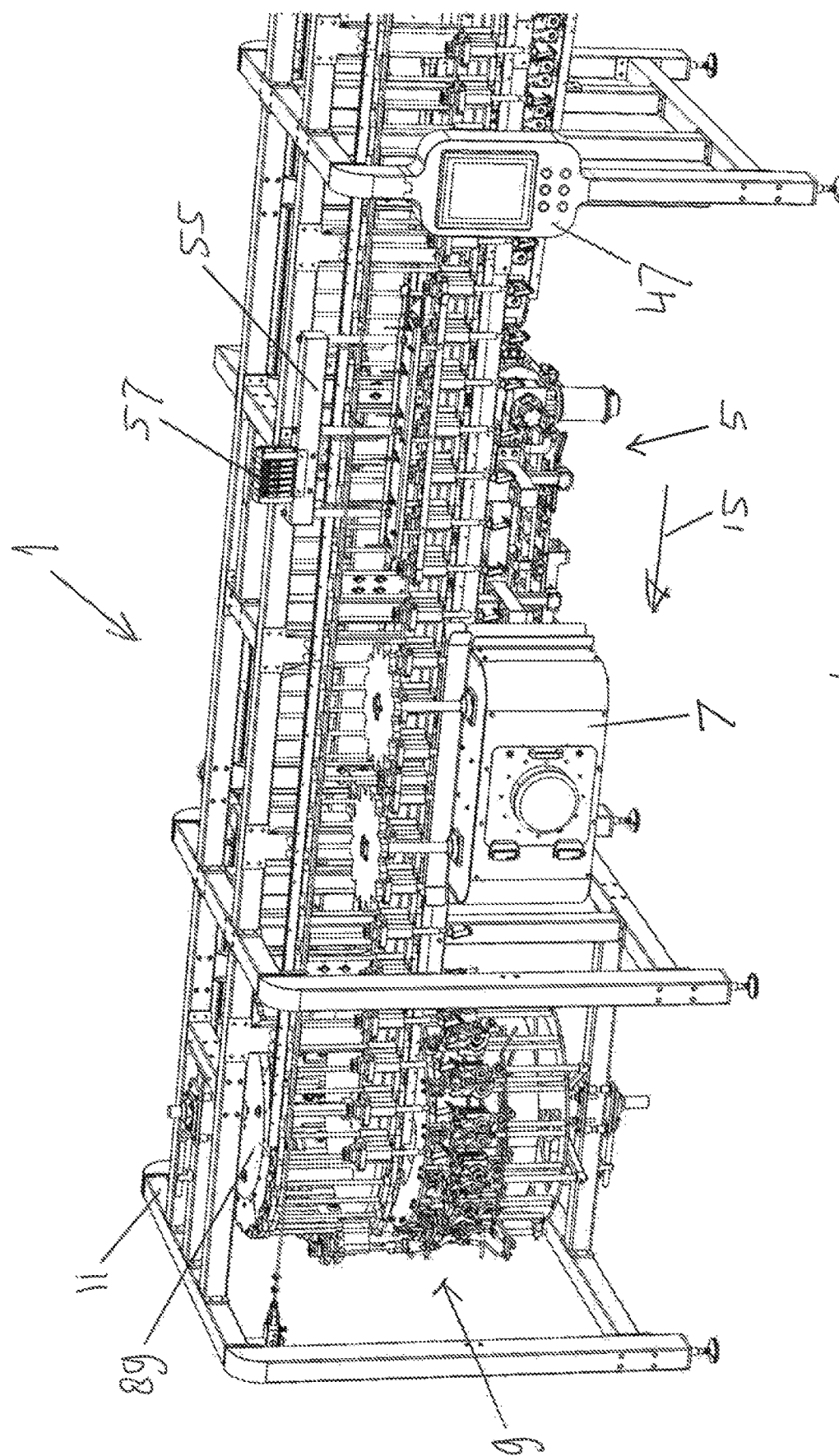
FIG. 4 is an enlarged detail view of the left hand part of FIG. 1 representing height resetting and the X-ray bone detection stations.

Referring now to FIG. 4 it is seen that the central frame part is associated with a control panel and unit 47. As should be understood this arrangement of control panel and unit is optional, and as may be convenient the control panel or associated control unit 47 can easily be located at different positions.

Figure 5:
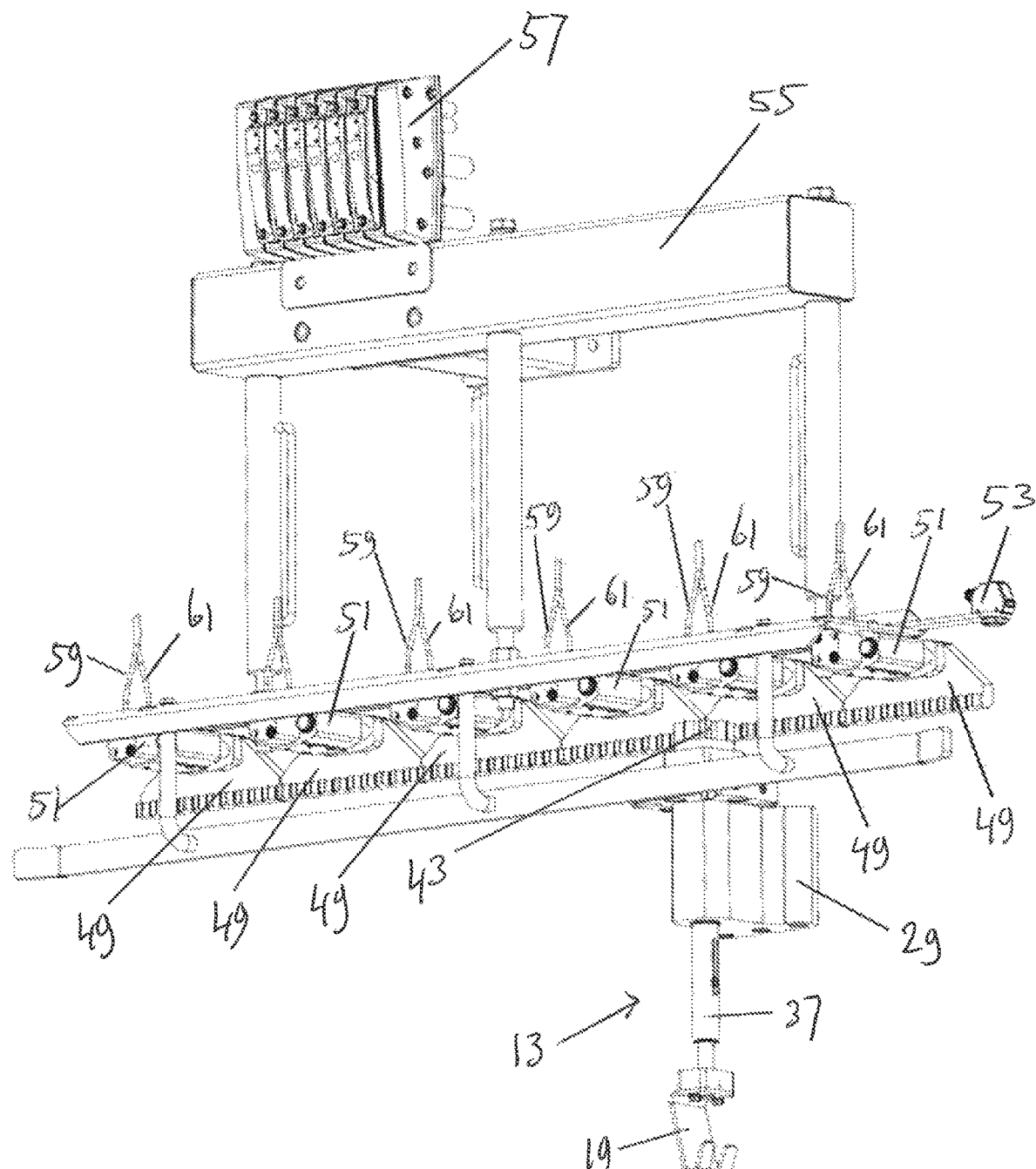
FIG. 5 is the height resetting station of FIG. 4.

The shackle level resetting station 5 is shown in more detail in FIG. 5 and includes a plurality of toothed racks 49, each adapted to engage and mesh with the pinion wheel 43 of one of the shackles 13. Each rack 49 can be operated by a pneumatic actuator 51 to be in or out of engagement with the pinion wheel 43. The function of the shackle level resetting station 5 is to reset each hook 19 of each shackle 13 to a predefined standard level. In the presently described example this is accomplished by a height sensor 53 detecting the yet unresetted hook level, and processing this sensor information to determine a number of rotations of the pinion wheel 43 to bring the telescoping shaft 37 into the predefined standard hook level. This determination then results in a duration of rack engagement to achieve the required number of rotations of pinion wheel 43 during its conveyance movement. The number of teeth on each rack and the number of teeth on each pinion wheel determine the maximum number of revolutions the pinion wheel will rotate when engaged with a single rack, and thus the maximum lift height the hook is raised or lowered by engagement of a pinion wheel with a single rack. In this example, the rack has ten teeth and the pinion wheel has eight teeth, resulting in a maximum of 1.25 rotations of the pinion wheel per rack. It will be clear that other ratios can be chosen as well. In this example, the maximum lift height of the hook 19 per rack is approximately 5 mm. The system may be arranged for disengaging a rack from the pinion wheel 43 before the pinion wheel reaches the end of the rack. Thus it is possible to raise or lower the hook 19 by amounts less than the maximum lift height per rack. Engagement between the toothed racks 49 and the pinion wheel 43 is interrupted as soon as the pinion wheel 43 has brought the hook 19 into the required standard level. Interruption of engagement is accomplished by the relevant pneumatic actuators 49 pushing the relevant racks 49 out of engagement from the pinion wheel 43. This pushing out of engagement will only apply to the racks in engagement with a particular one of the shackles 13, and those ahead in the direction of movement 15. The other racks 49 that have already been passed by the particular shackle 13 can remain in the engagement position to engage pinion wheels 43 of successive shackles 13. The entire level resetting station 5 is suspended from an outrigger frame 55 that is attached to the machine frame 11. Also mounted to the outrigger frame 55 is an electro-pneumatic valve block 57, which connects to the air hoses 59, 61 of each pneumatic actuator 51. A simplified form of resetting station may also use a full length toothed rack that is fixed. Then a maximum number of rotations may be applied to each pinion wheel 43, while a slip clutch or like in the telescoping shaft 37 may then accommodate any over adjustment.

Figure 6:
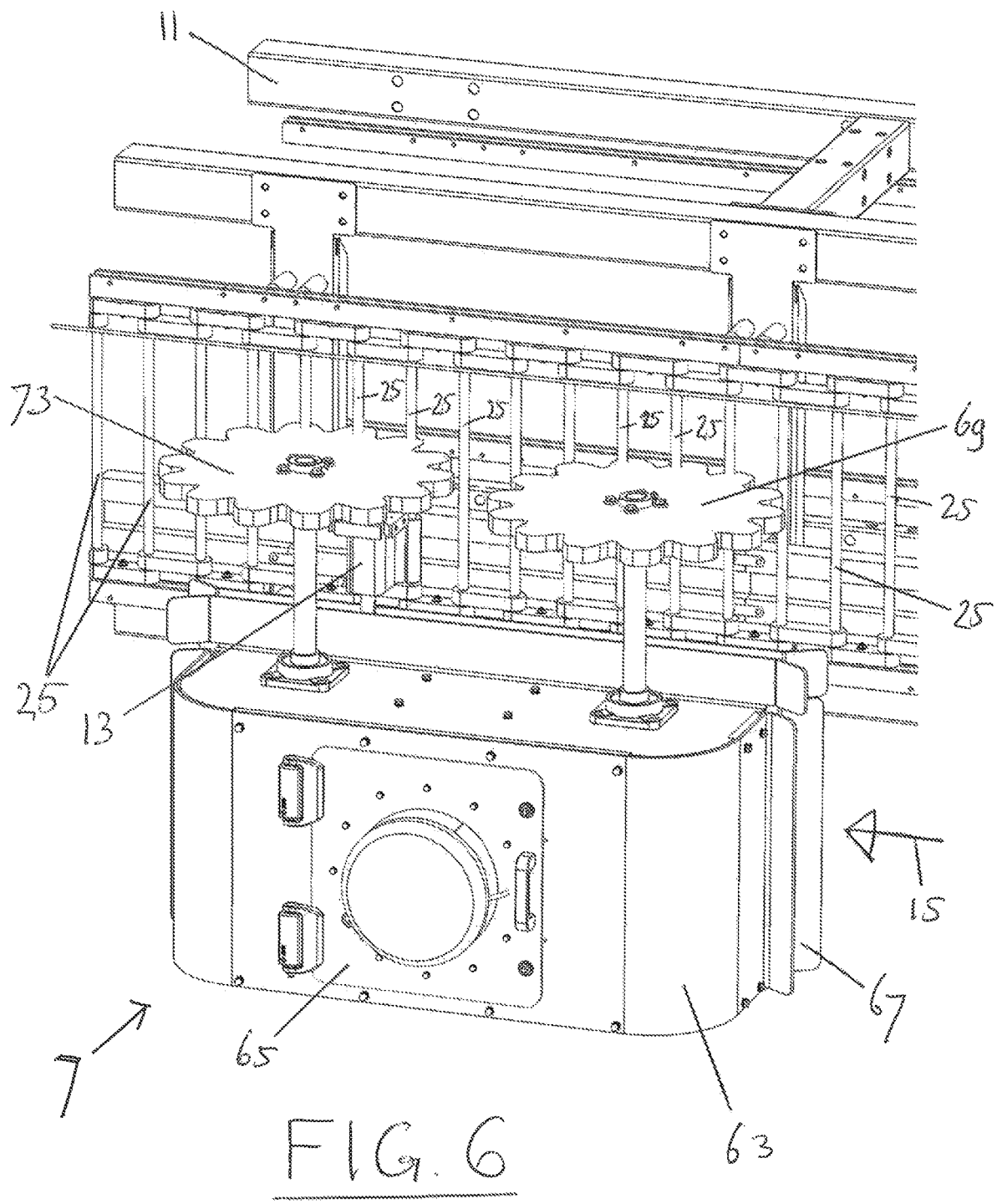
FIG. 6 is the X-ray detection station of FIG. 4.
Figure 7:
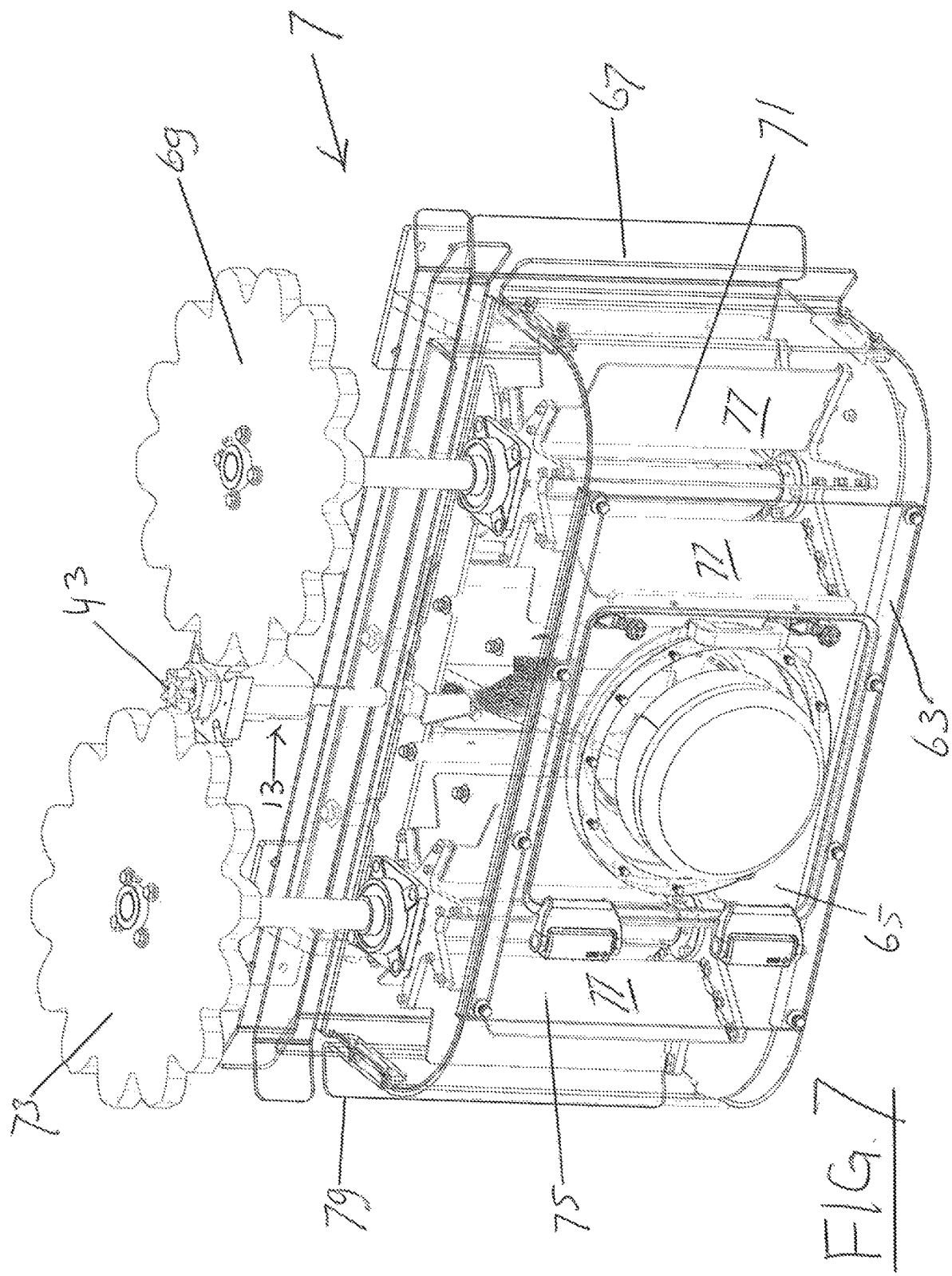
FIG. 7 is a ghost view showing internals of a detection unit of the X-ray detection station of FIG. 6.

Upon resetting to the predefined standard height/level the poultry leg carrying shackles 13 are progressing in the conveying direction 15 to enter the X-ray bone detection unit 7. This X-ray bone detection unit 7 is shown in more detail in FIG. 6. The X-ray source and detection unit are accommodated in a protective housing 63. Here, the protective housing has an inspection hatch 65. The housing 63 has an entrance slot 67 coinciding with the conveying path of the shackles 13, allowing the shackles 13 and/or the poultry legs suspended therefrom to pass through the protective housing 63. As further also seen in FIGS. 7 and 8 a first driving sprocket 69 is engaged by the vertical bars 25 of the conveyor chain and chives a first paddle wheel 71 on the entrance side of the protective housing 63. A second driving sprocket 73 in a similar manner chives a second paddle wheel 75 on the exit side of the protective housing 63. Each first and second paddle wheel 71, 75 has a plurality of paddle plates 77 arranged to prevent any reflected radiation to escape from the entrance slot 67 or an exit slot 79. The paddle plates 77 can e.g. be of sufficiently thick and sufficiently suitable metal to prevent any reflected radiation to escape from the entrance slot 67 or the exit slot 79.

Figure 8:
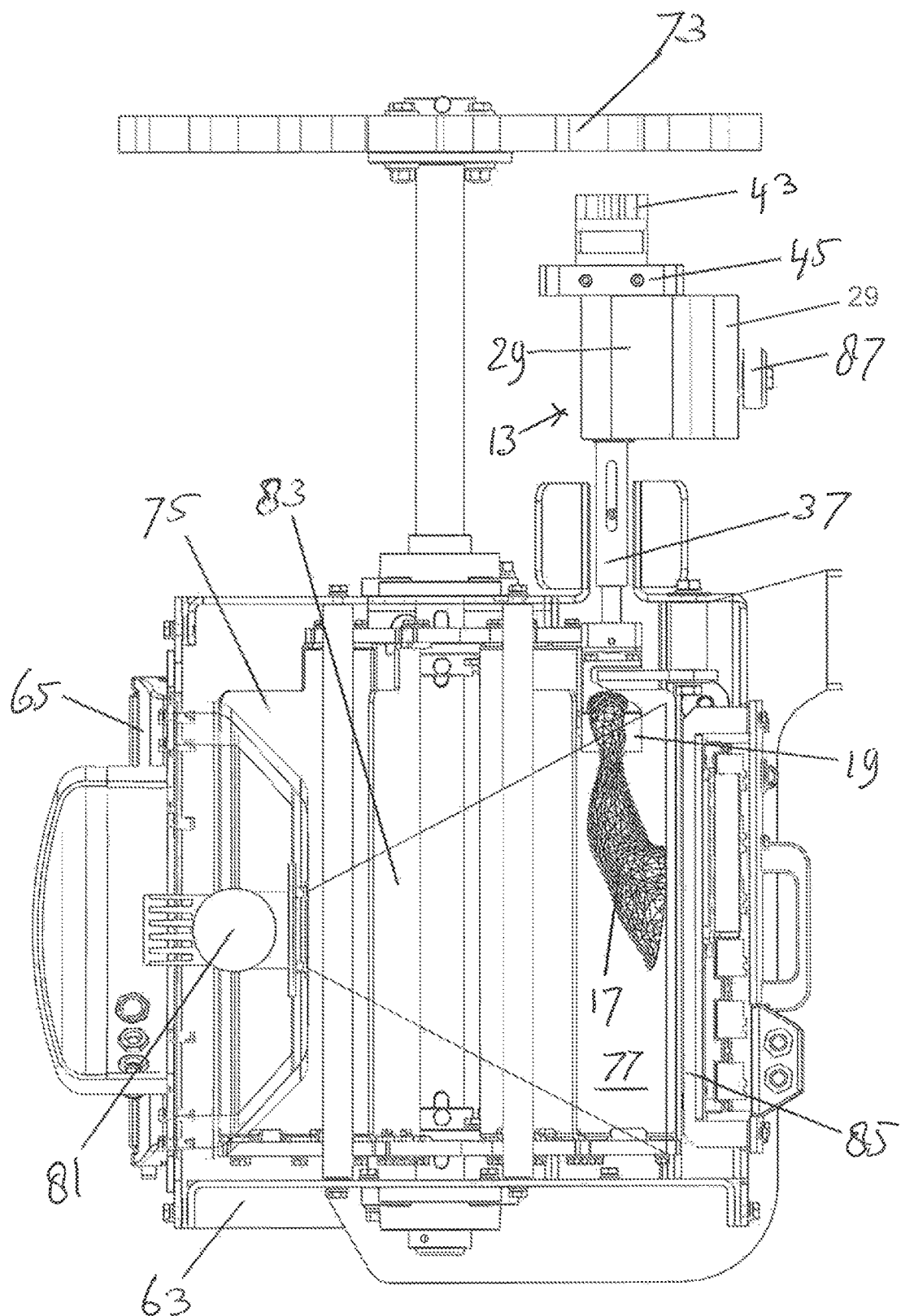
FIG. 8 is a transverse cross section of the X-ray detection unit of FIG. 6.

As seen in the cross section of FIG. 8 an X-ray source 81 projects a radiation beam 83 onto a radiation detector module 85. With one of the shackles 13 carrying a poultry leg 17 inside the protective housing 63, the poultry leg 17 is within the field of the X-ray beam 83 and its internal bone structure will become discernable by the detector module 85. At the same time the exit slot 79 is closed by one of the paddle plates 77 of the second paddle wheel 75. A similar situation exists at the entrance slot 67, but this is not visible in FIG. 8 by deletion of the first paddle wheel 71. It is further seen in FIG. 8 that the body part 29 of the shackle 13 has a guide roller 87 on a side thereof not visible in FIG. 3. The image projected by the X-ray beam 83 onto the detector module 85 is obtained while the poultry leg is being conveyed, i.e. is moving, through the X-ray bone detection unit 7. The image is analyzed by the control unit 47 and converted into a height adjustment signal for the respective shackle 13 to position the intermediate knee joint of each poultry leg at the same level for cutting and meat stripping, as will be explained below.

Finally FIG. 4 illustrates that the J-cutter section 9 is combined with an idler carrousel 89, which also directs the conveying path to a reverse side of the machine 1. This J-cutter section 9 is substantially similar to the J-cutter device described in patent application document WO 2016/122314 and is not itself part of the present invention. It will be appreciated that the poultry leg carrying shackles 13 exiting the X-ray bone detection unit 7 are conveyed to the J-cutter section 9.

Figure 9:
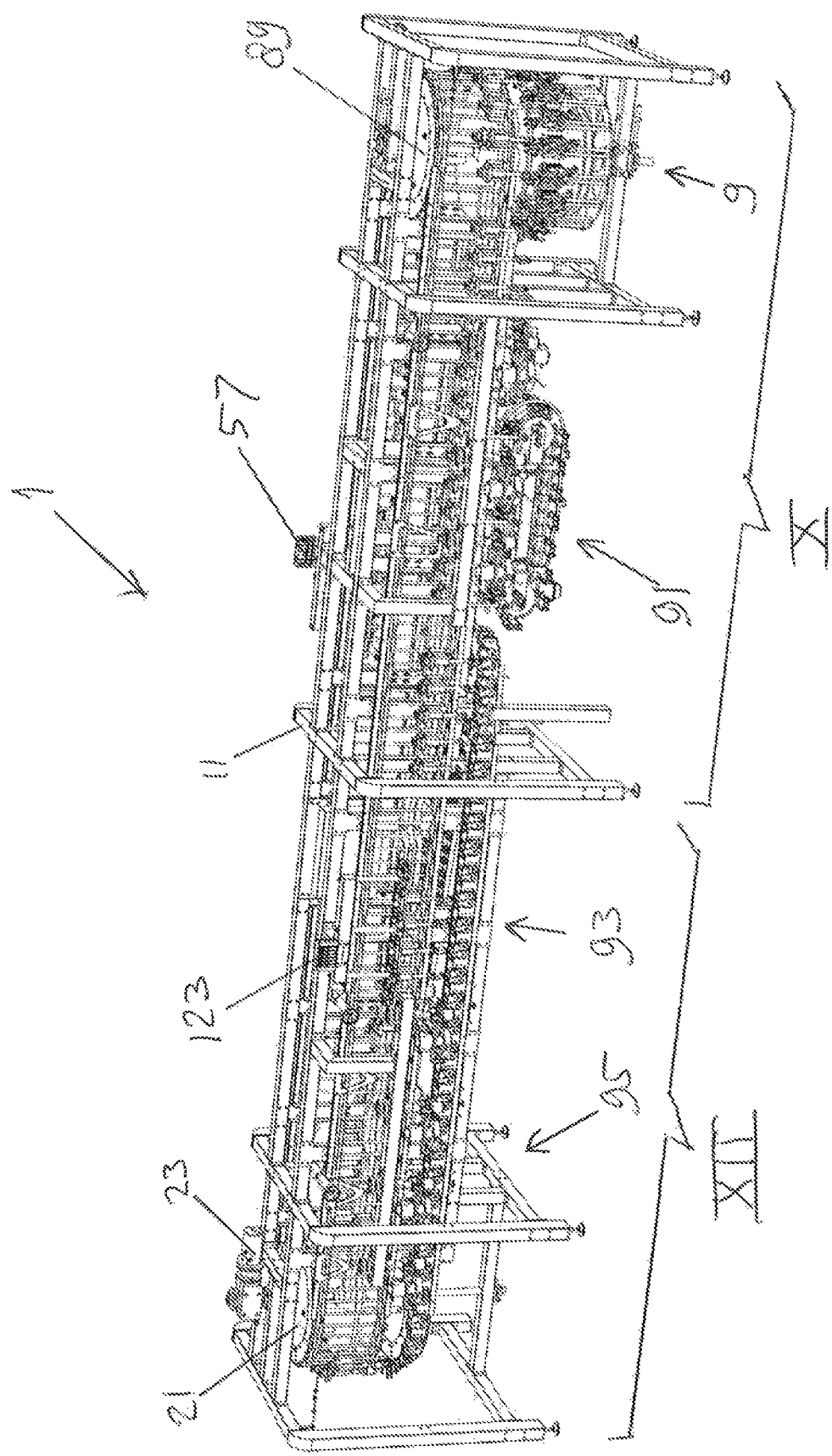
FIG. 9 is an overview showing a reverse or rear side of the machine of FIG. 1.

The reverse or rear side of the machine 1 is illustrated in FIG. 9. A right hand portion identified by X represents the J-cutter 9 and selective tendon cutting section and unit 91, and is illustrated in greater detail in FIG. 10. The left hand portion identified by XII represents the shackle height level position adjusting station 93, and meat stripper section 95, as illustrated in greater detail in FIG. 12.

Figure 10:
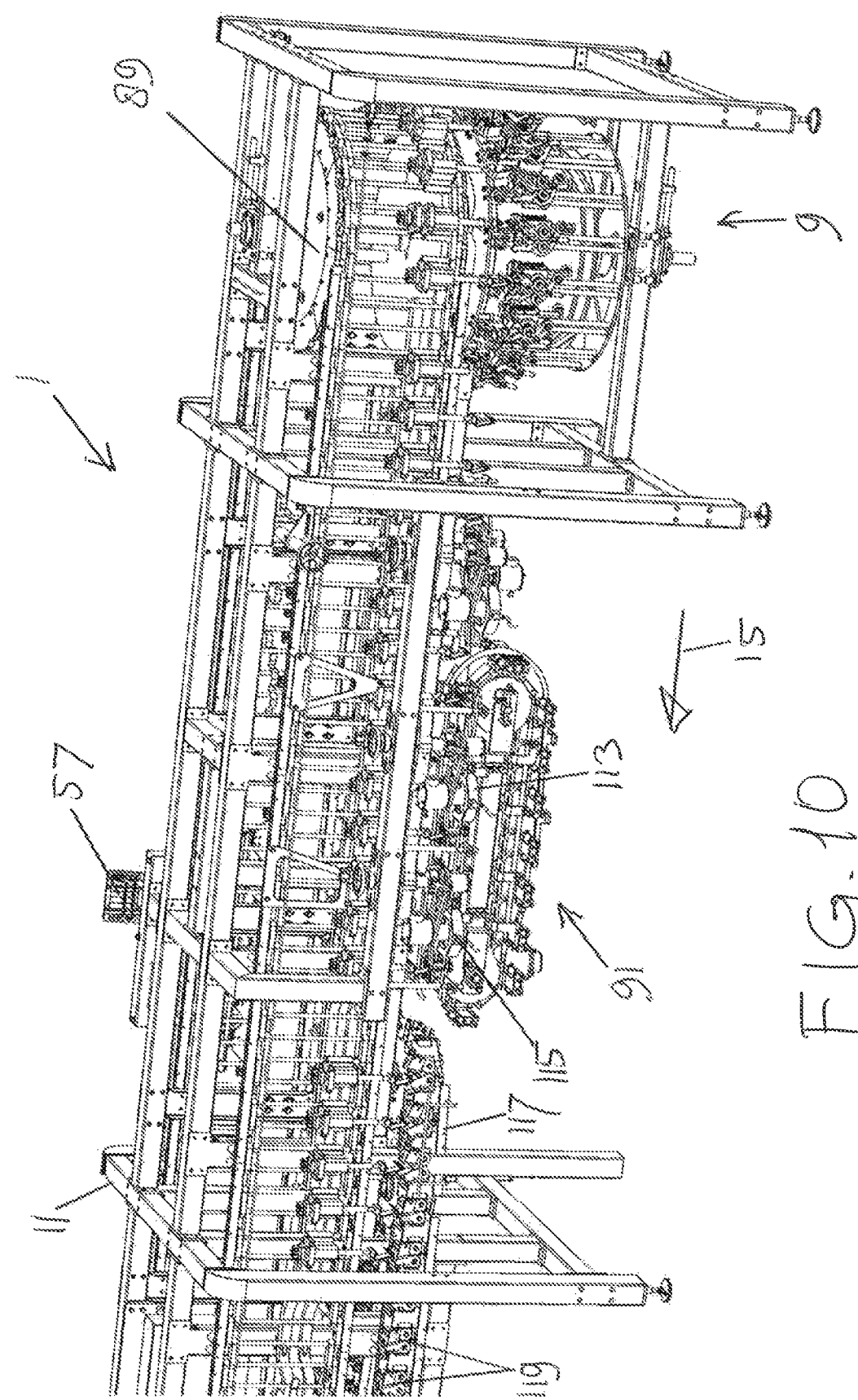
FIG. 10 is an enlarged detail view of the right hand part of FIG. 9, representing a J-cut and tendon cutting section.
Figure 11:
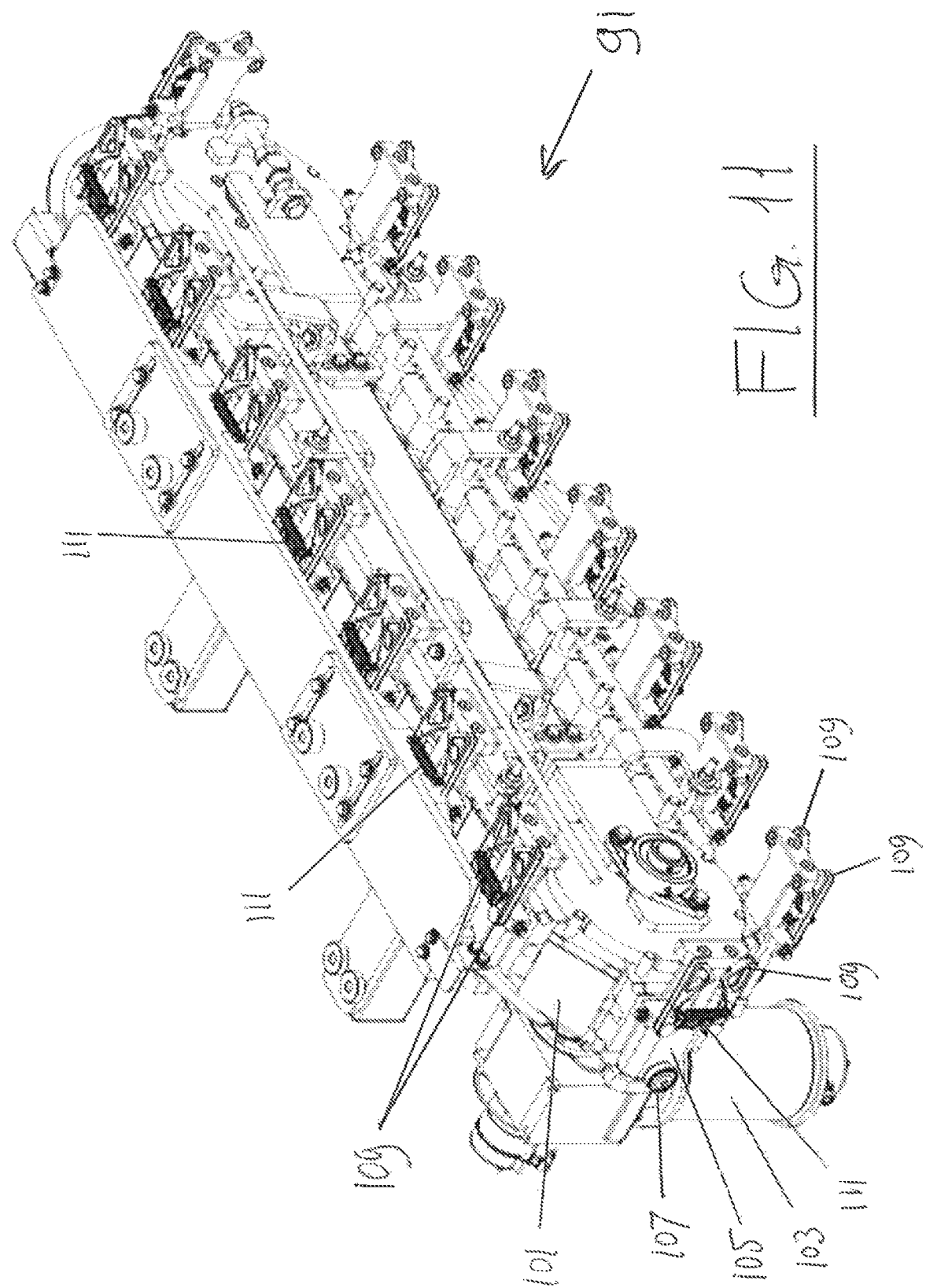
FIG. 11 is the tendon cutter of FIG. 10.

Referring now to FIG. 10, it is seen that the poultry leg carrying shackles 13 after leaving the J-cutter 9 progress in the conveying direction 15 towards the selective tendon cutter unit 91. The selective tendon cutter unit 91 is arranged for cutting tendons within the so called drumstick part of the poultry leg and performs tendon cutting, while leaving the fibula bone uncut and connected to the tibia bone. This tendon cutter unit 91 can be not unlike the cutter described in patent publication U.S. Pat. No. 8,961,274, and uses the same method. A significant difference is that the endless conveyor chain 101 (see FIG. 11) moves in a vertical plane, whereas the conveyor chain in U.S. Pat. No. 8,961,274 moves in a horizontal plane. As shown in FIG. 11 the tendon cutter unit 91 has a driving motor 103 driving the conveyor chain 101. The conveyor chain has a plurality of carrier blocks 105 along its length, and each carrier block 105 has a cam follower wheel 107 extending from an outer surface to engage a camtrack (not visible, but conventional). Each carrier block 105 is fitted with a pair of articulated pincher jaws 109, which are biased to a closed position by a spring 111. The pincher jaws 109 as will be understood from the referenced patent publication U.S. Pat. No. 8,961,274 will bring the relevant tendons in engagement with rotary knives 113, 115 (see FIG. 10) by moving inwardly and outwardly with respect to the conveyor chain 101. Reference to aforementioned U.S. Pat. No. 8,961,271 thereby renders a further description redundant.

Figure 12:
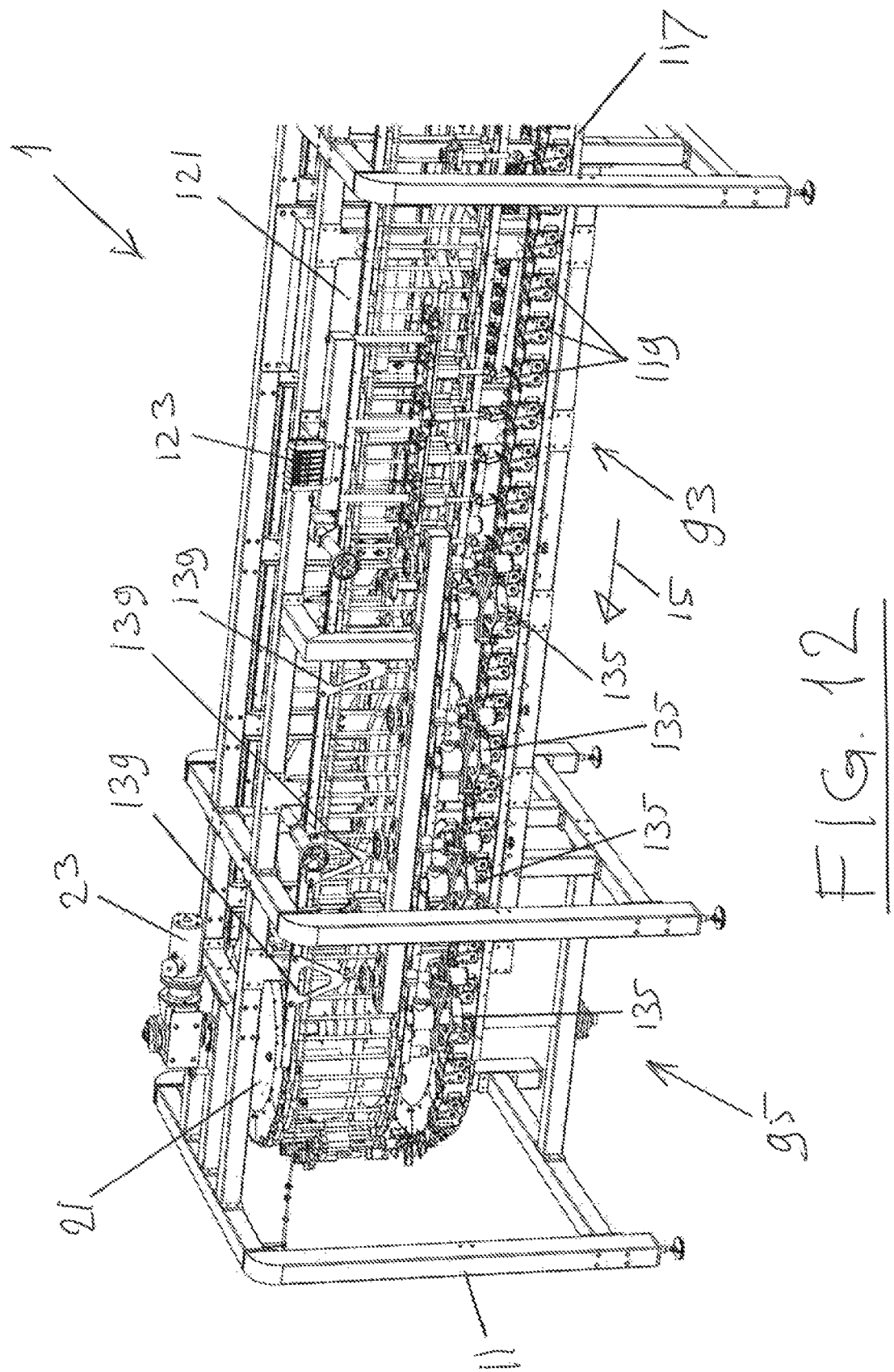
FIG. 12 is an enlarged detail view of the left hand part of FIG. 9, representing a height adjustment and a meat cutting, tensioning and stripper section.

In FIG. 12 the left hand part of the machine 1, as shown in FIG. 9 is shown at an enlarged scale allowing to recognise in conjunction also with FIG. 10 that there is a further conveyor system 117 that extends from amidst the machine 1 up to the driven carrousel 21 at a level below the conveyor chain that moves the shackles 13 by its vertically extending bars 25. The further conveyor system 117 moves a plurality of grippers 119 in the same direction of conveyance 15 as the shackles 13. After leaving the selective tendon cutter unit 91 the poultry leg carrying shackles 13 progress towards the shackle level adjusting station 93, which is shown in more detail in FIGS. 13 and 14.

Figure 13:
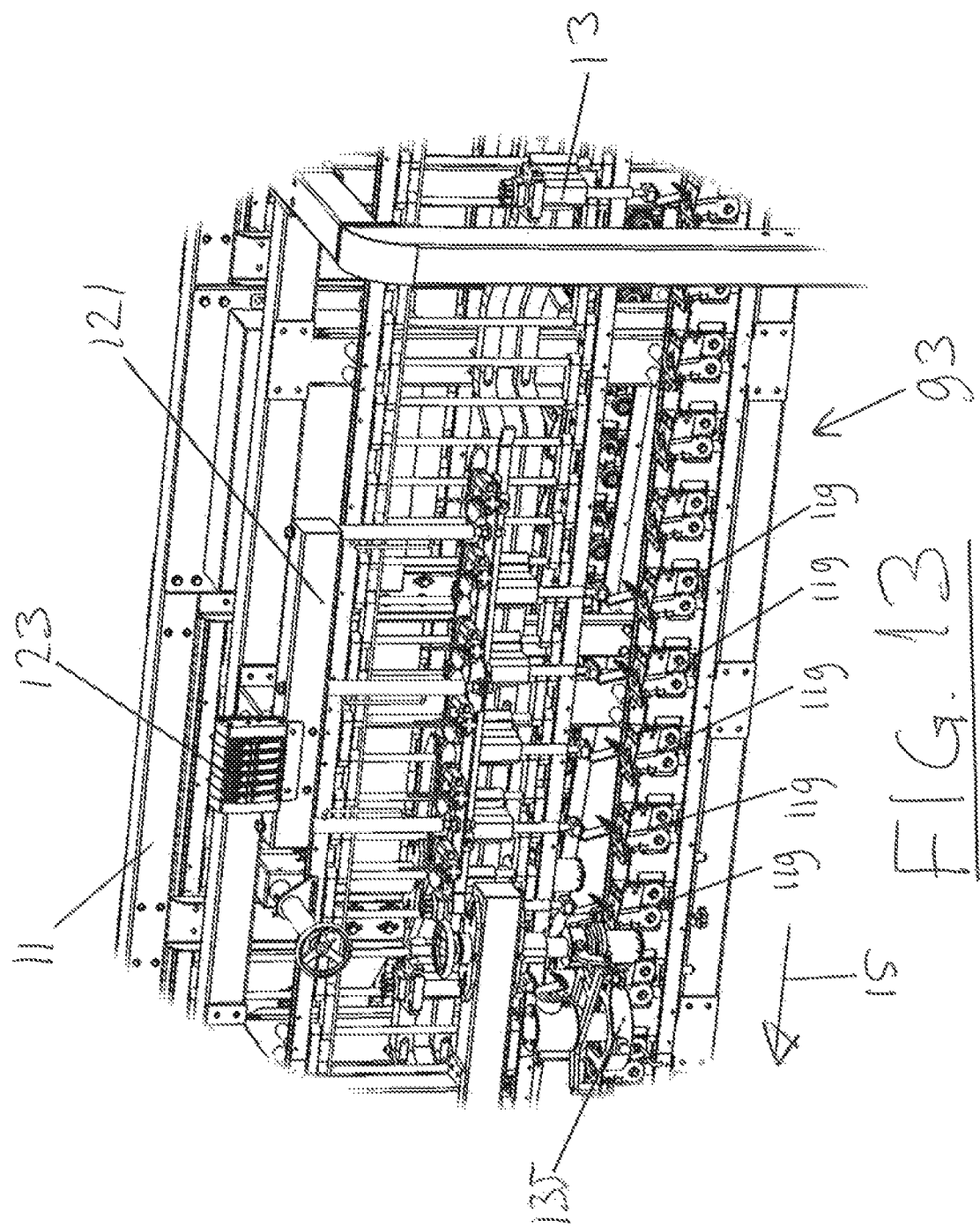
FIG. 13 shows the height adjustment unit of FIG. 12 on an enlarged scale.
Figure 14:
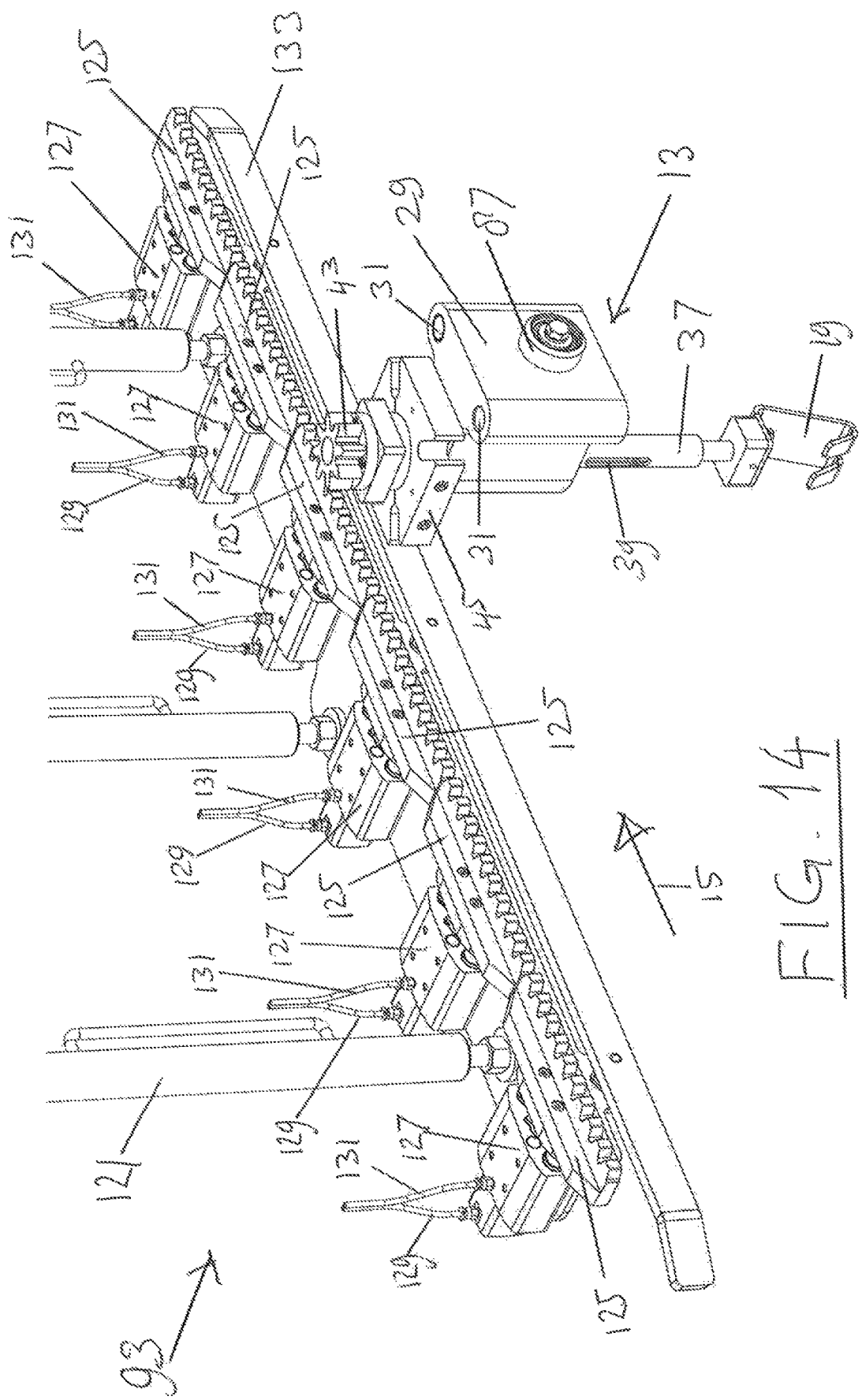
FIG. 14 is a detail view of the height adjustment unit of FIG. 13, viewed from an opposite position with surrounding structure deleted for clarity.

As seen in FIGS. 13 and 14 the level adjusting station 93 includes a sub-frame 121 that attaches to the machine frame 11. The sub frame 121 also carries a pneumatic valve block 123 for a similar purpose as the pneumatic valve block 57 discussed in reference to FIG. 5.

FIG. 14 is a detailed view of the level adjusting station 93 viewed in a direction opposite from FIG. 13. In the shackle level adjusting station 93 the shackles 13 are each adjusted from their reset standard height to the determined knee joint level. Hence, the knee joints of the legs suspended from the shackles 13 are all positioned at the same height after passing the shackle level adjusting station 93. To this end the level adjusting station 93 includes a plurality of adjusting racks 125, which each can be brought into meshing engagement with the pinon wheels 43 of the shackles 13. Pneumatic actuators 127 can be selectively operated to move respective ones of the racks 125 into and out of meshing engagement with the pinion wheel 43 of a particular shackle. Selective operation of the various pneumatic actuators 127 is accomplished by the pneumatic valve block 123 using pneumatic conduits 129, 131. Also in the level adjusting station 93, the number of teeth on each rack and the number of teeth on each pinion wheel determine the maximum number of revolutions the pinion wheel will rotate when engaged with a single rack, and thus the maximum lift height the hook is raised or lowered by engagement of a pinion wheel with a single rack. The level adjusting station 93 may be arranged for disengaging a rack from the pinion wheel 43 before the pinion wheel reaches the end of the rack. Thus it is possible to raise or lower the hook 19 by amounts less than the maximum lift height per rack. Preferably, the minimum lift height increment is between 0.5-2 mm to allow accurate height positioning of the knee of the poultry leg suspended from the hook. Preferably, the system is arranged for positioning the knee with an accuracy of within +/−1 mm, more preferably within +/−0.5 mm. A guide rail 133 for guiding the Maltese cross 45 of each shackle 13, as well as the entire assembly of racks 125 and pneumatic actuators 127 is suspended from the sub-frame 121.

The analysed information from the X-ray bone detector unit 7 is processed by the control unit 47 to result in a number of rotations for each pinion wheel 43 to bring each shackle 13 from its standard level setting to a determined level setting commensurate with the knee joint position of the respective poultry leg 17 that it carries. The level setting by the adjusting station 93 is obtained by allowing each shackle 13 and its associated pinion wheel 43 to be in engagement with one or more of the adjustment racks 125 for a predetermined period of time while the respective shackle 13 is being conveyed along the adjusting station 93 in the direction of conveyance 15. It will be appreciated that the X-ray bone detection unit 7 is positioned at a different position from the adjusting station 93. Therefore, there is a time lag between the measuring of the knee joint position of a leg carried by a particular shackle 13, and the adjusting of the knee level for that particular shackle 13. The control unit 47 can account for the time lag, e.g. by accounting for a predetermined number of shackles present between the X-ray bone detection unit 7 and the adjusting station 93.

From the level adjusting station 93 the poultry leg carrying shackles 13 progress towards the meat stripper section 95.

Figure 15:
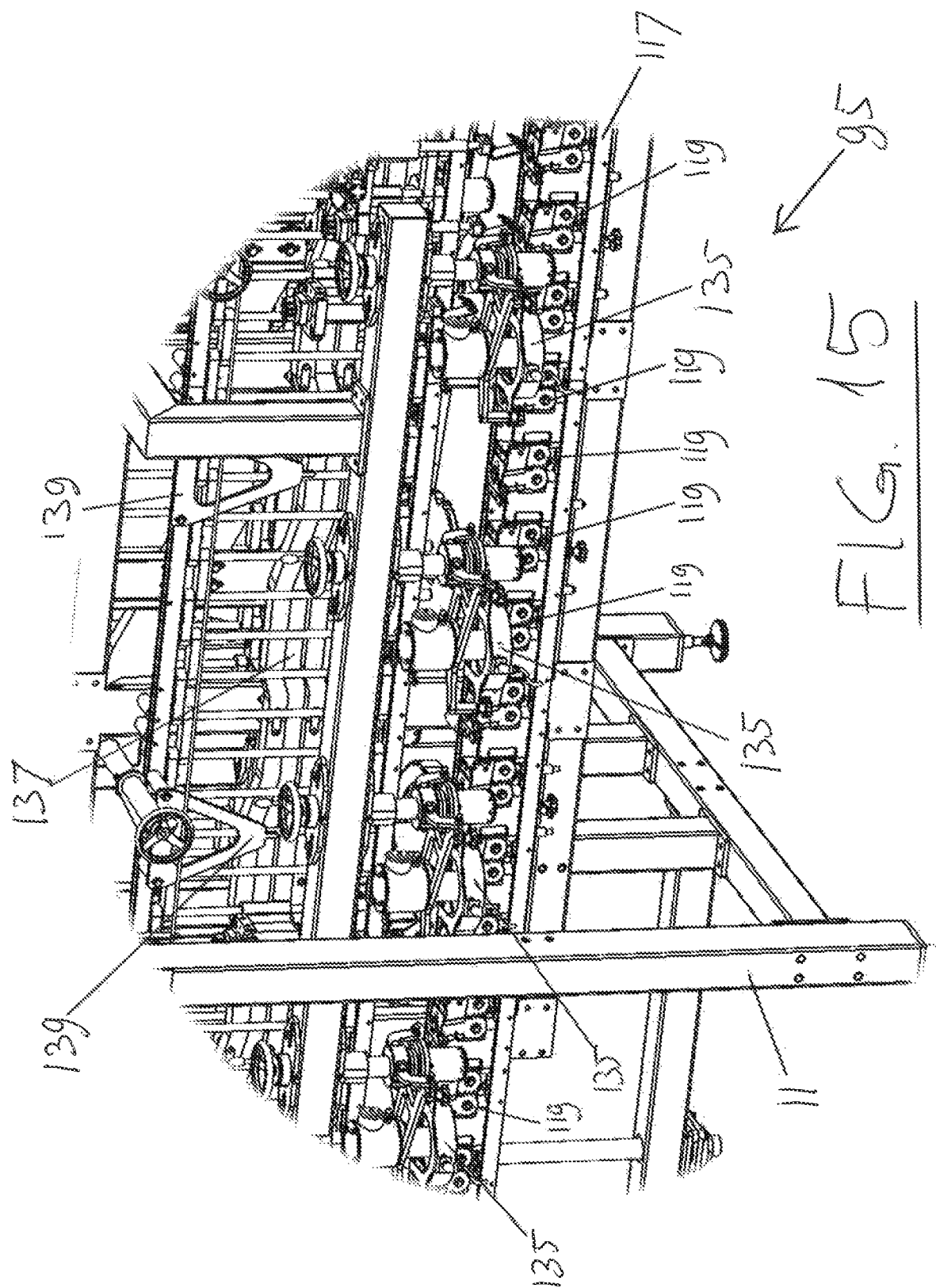
FIG. 15 is an enlarged detail of FIG. 12, showing part of the meat cutting, tensioning and stripper section of the machine.
Figure 16A:
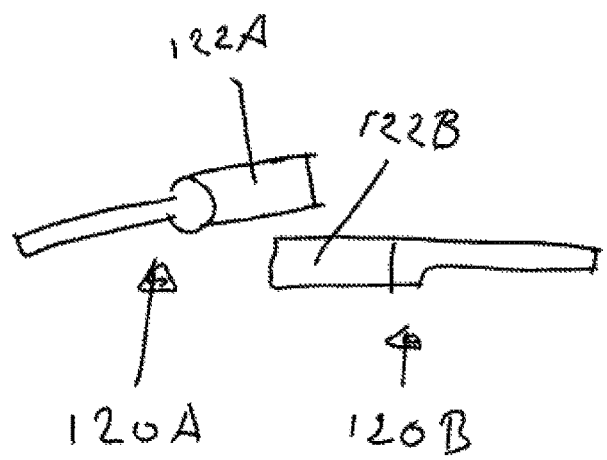
FIGS. 16A and 16B is a schematic detail of a gripper.
Figure 16B:
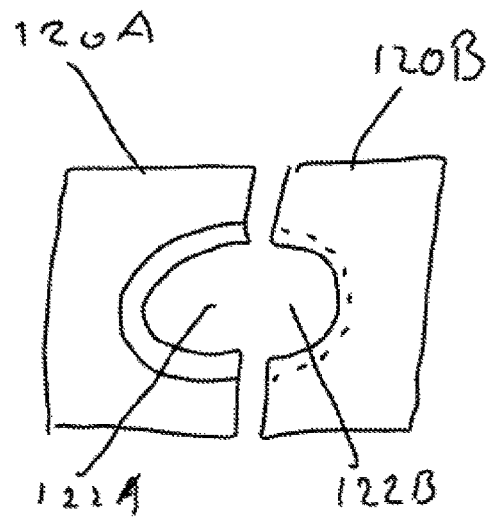

A detail of the further conveyor system 117 is shown in FIG. 15, from which it can be seen that the successive plurality of grippers 119 is formed into an endless conveyor chain that revolves in unison around the driven carrousel 21 as shown in FIG. 12 and FIG. 2. In this example, each gripper 119 includes two plates 120A, 120B. Each plate includes a cutout 122A, 122B. The plates 120A, 120B are shown in side cross sectional view in FIG. 16A and in top view in FIG. 16B. The cutouts allow firm gripping of the meat by forming a hole of adjustable size when the two plates are brought in overlap. Here, the edges of the cutouts 122A, 122B of the plates 120A, 120B have a thickness of about 4-7 mm, preferably of 5-6 mm. Such thickness prevents the edges from wedging between the bones at the knee joint. Here the cutout 122A of the first plate 120A has a rounded edge. In this example the rounded edge is formed by a beaded edge. Here the cutout 122B of the second plate 120B has a non-cutting square edge. In this example, the square edge is formed by a lip.

Over a length of the conveying path of the poultry legs 17 as seen in FIGS. 10, 12 and 2 the shackle hooks 19 and the grippers 119 are moving in synchronisation with each other. Thereby the grippers 119 are moved past a succession of tissue cutting implements or knives 135. In this example, the tissue cutting implements are in the form of rotary cutting blades. The grippers 119 which are formed into an endless conveyor chain, each have a guide roller engaged in a camtrack (not shown, but conventional) for opening and closing a pair of opposite gripper jaws. During conveyance the grippers 119 all remain in the same level determined by the further conveyor system 117. The shackle hooks 19 holding the knee joints at exactly the same level, relative to the body part 29, during conveyance are moved up and down by a guide track 137 of which a portion is visible in FIG. 15. The arrangement of controlled opening and closing grippers 119, of up-and-down moving shackle hooks 19, and of the cutting knife 135 positions is such that the meat is gripped to tension tissue, which is then cut. This cycle is repeated on one or more, such as three or all, sides of the poultry leg 17 by incremental rotation of the Maltese cross 45 of each shackle 13 engaging turning members 139. In this example, the grippers 119 eventually strip the meat from near the ankle joint towards the knee joint and further to or beyond the hip joint of the bones suspended from the shackle 13.

Figure 17:
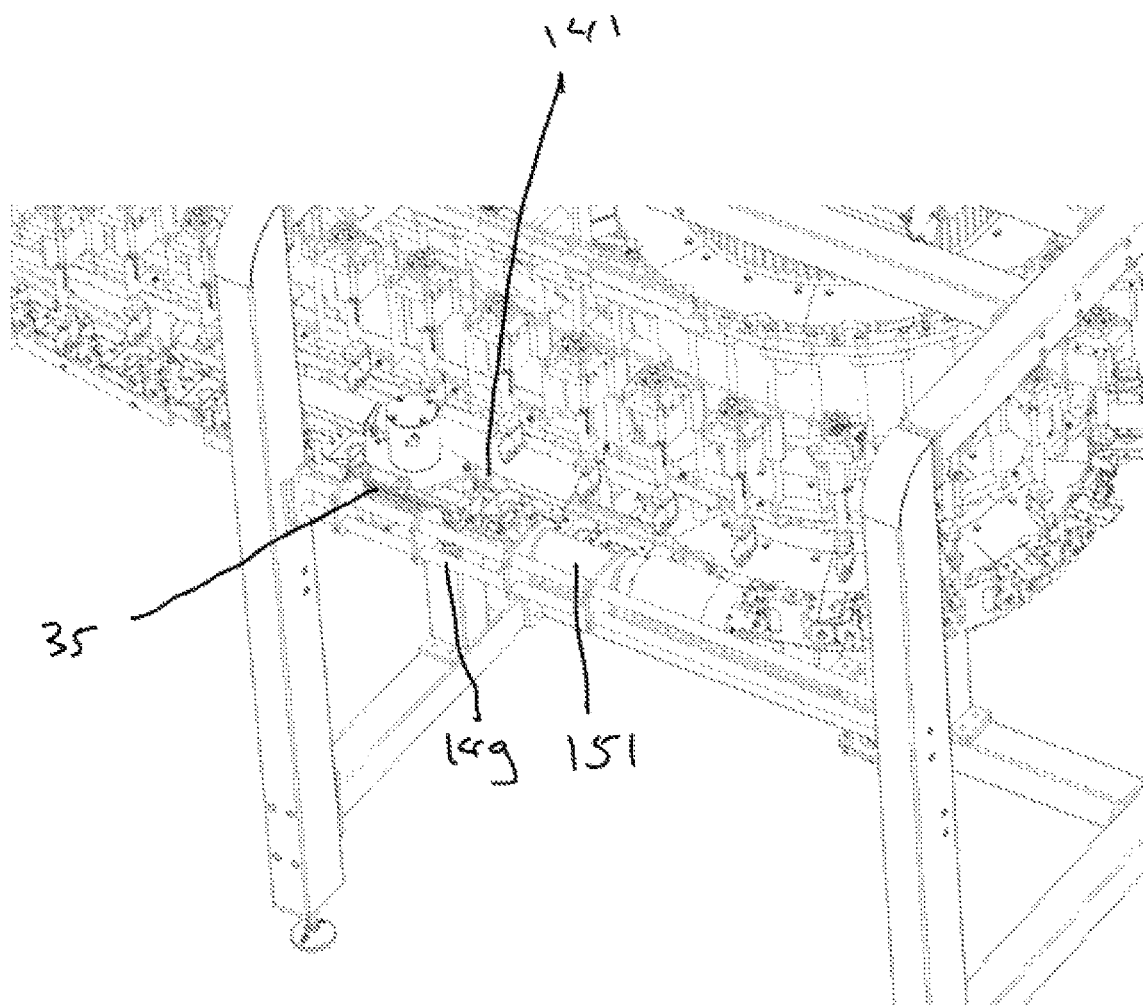
FIG. 17 is a detail of a cutting station.
Figure 18A:
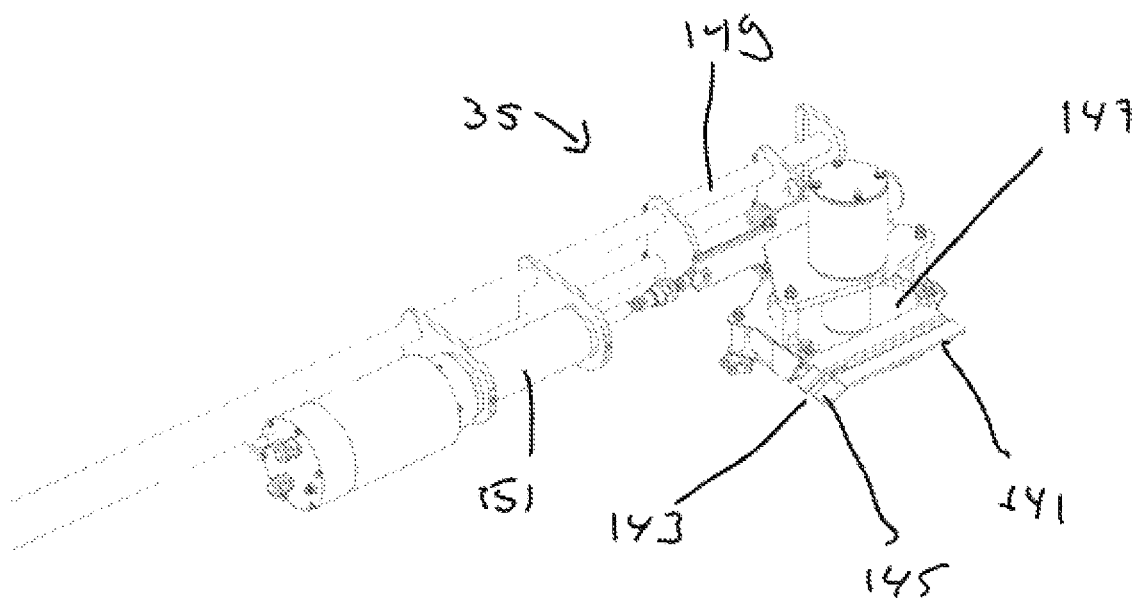
FIGS. 18A and 18B is a schematic detail of a cutting station.
Figure 18B:
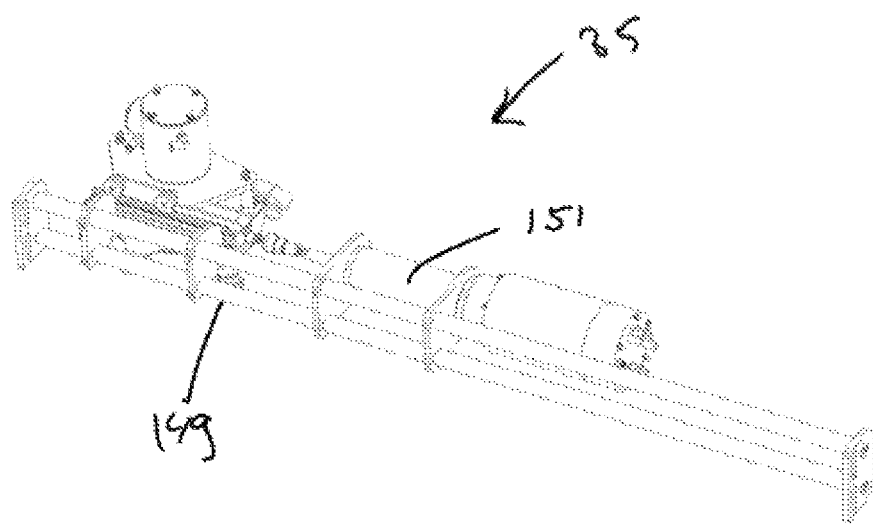

Final harvesting of the surrounding meat from the poultry leg 17 takes place at the driven carrousel 21 and last cutting station 35, see FIG. 17 and FIGS. 18A, 18B. The cutting station 35 is arranged for making the final cut to separate the meat from the bones. The poultry leg 17 arrives at the cutting station 35 with the meat depending from the thigh bone near the hip end. The cutting station 35 includes a plate 141 with a slot 143. The thigh bone hip end runs onto a top side of the plate 141, e.g. at a ramp 145. The meat depends from the thigh bone below the plate 141 through the slot 143. A knife, here rotary knife 147 separates the meat from the bone. As explained, the length of the bones may vary per shackle 13. Therefore, the final cut is preferably made commensurate with the length of the bones. Thereto, the knife 147 of the final cutting station 35 is adjustable in height relative to the shackle. In this example the height adjustment is achieved by moving the shackle hooks 19 of the shackles 13 upwards by having the rollers 87 follow a ramp, and adjusting the horizontal position of the knife 147 in a direction along the conveyor chain relative to the ramp. Thereto the cutting station 35 includes a guide 149 and an actuator 151 for positioning the knife 147 along the guide 149. Here the plate 141 moves along with the knife 147. The shackle hooks 19 moving along the ramp, causes the horizontal adjustment of the knife to result in a vertical adjustment of the cut relative to the shackle hook 19. In this example, the cutting height (horizontal position) of the knife 147 is set in accordance with a total length of the bones, i.e. a position of the hip end of the thigh bone, as determined by the X-ray bone detection unit 7.

After the final cut is made, the meat is completely separated from the bones and e.g. falls onto a further conveyor (not shown). After separation the bone is discarded from the shackle hook 19. From then the process continues as described again starting from FIG. 2.

FIGS. 19 and 20 shows views of a machine for harvesting meat from a poultry leg. The machine as shown in FIGS. 19 and 20 is similar to the machine shown in FIGS. 1, 2, 4, 9, 10, and 12. Features in common with the machine 1 as described in view of FIGS. 1-18 are not described again for conciseness.

The machine 1 in FIG. 19 is shown from a front side and includes the loading section 3. In this example, a first shackle level resetting station 5A is positioned upstream of the loading section 3. The first shackle resetting station 5A resets the shackles 13 such that the hooks 19 are all positioned at a predetermined height. In this example, the predetermined height is chosen central in the height adjustment range of the shackles, e.g. in the middle. Here the predetermined height position is associated with an average leg length of the legs expected to be deboned by the machine.

From the loading section 3, the shackles 13 are transported to the X-ray bone detection unit 7.

Figure 21:
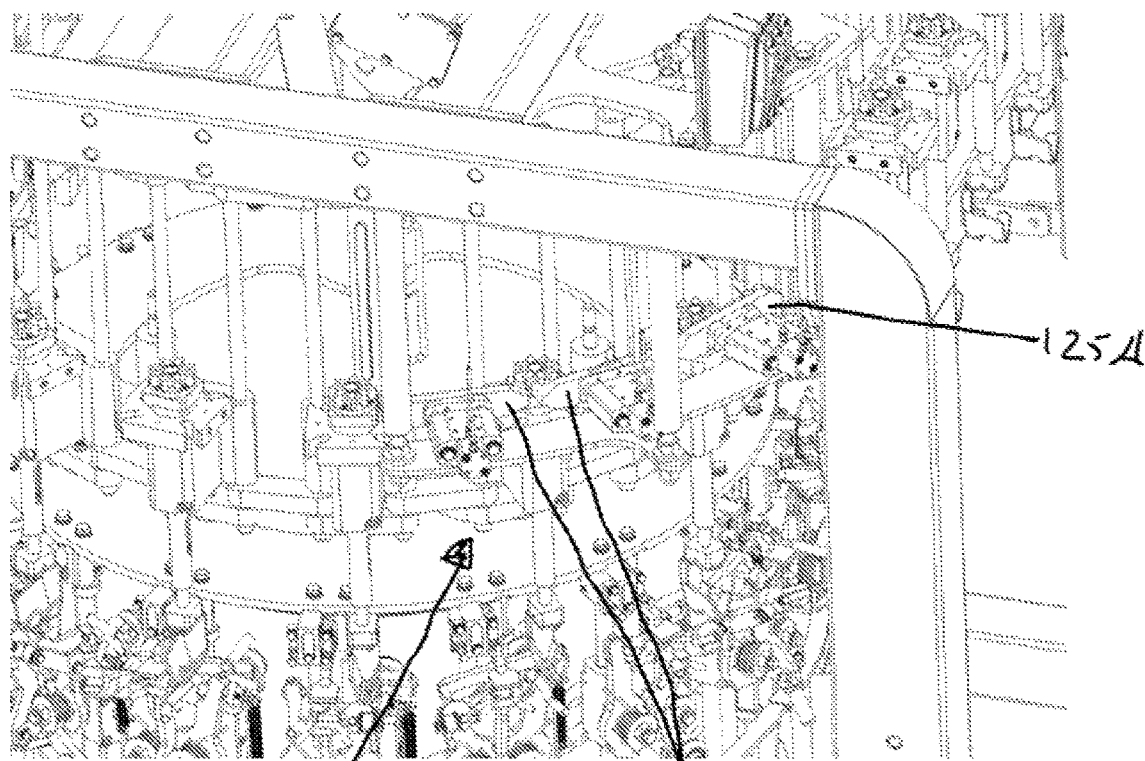
FIG. 21 is a detail view of a level adjusting station.

In this example, the X-ray bone detection unit is followed by a first level adjusting station 93A. FIG. 21 shows a detail of the first level adjusting station 93A. The first level adjusting station 93A is positioned around a part of the carrousel 89. The first level adjusting station is arranged for adjusting the height of the knee joints of all legs to be substantially the same before the J-cutter 9 cuts into the meat. In this example, the first level adjusting station 93A has racks 125A only on an outer side of the track. Hence, the hooks can be adjusted upwards for accommodating legs that are longer than the average leg length. It will be appreciated that the first level adjusting station 93A can also have racks only on an outside sides of the track for allowing downward adjustment of the hooks. It will be appreciated that the first level adjusting station 93A can also have racks on both sides of the track for allowing adjustment of the hooks up and down.

The machine 1 in FIG. 20 is shown from a rear side. From the J-cutter station 9, the shackles are conveyed to a second shackle resetting station 5B. The second shackle resetting station 5B resets the shackles 13 such that the hooks 19 are all positioned at the predetermined height. The poultry leg carrying shackles 13 after leaving the second shackle resetting station 5B progress in the conveying direction 15 towards the selective tendon cutter unit 91.

In a modified variety of this example, the X-ray bone detection unit is not followed by the first level adjusting station 93A, or the first level adjusting station does not adjust the height of the knee joints of all legs to be substantially the same before the J-cutter section 9 cuts into the meat.

In a modified variety of this example, the second shackle resetting station 5B is replaced by a level adjusting station arranged for adjusting the height of the knee joints, or another defined position along the leg, of all legs to be substantially the same before the shackles progress in the conveying direction 15 towards the selective tendon cutter unit 91. It will be appreciated that it is not necessary that the knee joints are all adjusted to be at the same height. It is, for example, also possible to define a position along the leg, e.g. at 20%, or 50% or 80%, e.g. between the knee and a suspension point of the leg in the shackle, and align those positions for all legs. Hence, a reference point on the legs to be aligned can be determined by the knee position and a length of the respective leg.

After leaving the selective tendon cutter unit 91 the poultry leg carrying shackles 13 progress towards the second shackle level adjusting station 93B. The second level adjusting station 93B corresponds to the level adjusting station 93 as shown i.a. in FIG. 12. In the second shackle level adjusting station 93B the shackles 13 are each adjusted from their reset predetermined height to the determined knee joint level. Hence, the knee joints of the legs suspended from the shackles 13 are all positioned at the same height after passing the second shackle level adjusting station 93B. In this example, the second level adjusting station 93B has racks on both sides of the track for allowing adjustment of the hooks up and down. In this example the range of height adjustment in the second adjusting station is about 45 mm. However, other adjustment ranges are possible.

From the second level adjusting station 93B the poultry leg carrying shackles 13 progress towards the meat stripper section 95. In this example, in the meat stripper section 95, with all knees adjusted to the same height, the body parts 29 are moved upwards, by guiding the guide roller 87 upwards in the guide track 137, for stripping the meat from lower leg towards the knee. A first set of cutting implements or knives, here rotary knives, 135 cut the meat at a height just below (i.e. towards the ankle) the knee. In this example, the turning members 139 rotate the leg over 90 degrees two times between knives 135 so as to cut the leg on three sides, here front left and right. This leaves the meat uncut in the popliteal fossa. Next, the body parts 29 are moved upwards, by guiding the guide roller 87 upwards in the guide track 137, for stripping the meat to approximately the knee height. A second set of cutting implements or knives, here rotary knives, 135 cut the meat at knee height. In this example, the same three sides are cut. Next, the body parts 29 are moved upwards, by guiding the guide roller 87 upwards in the guide track 137, for stripping the meat to above the knee. A third set of cutting implements or knives, here rotary knives, 135 cut the meat above the knee. In this example, the same three sides are cut. Next, the body parts 29 are moved upwards, by guiding the guide roller 87 upwards in the guide track 137, for stripping the meat to the hip joint. Hence, the grippers 119 and cutting implements or knives 135 strip the meat from near the ankle joint towards the knee joint and further to or beyond the hip joint of the bones suspended from the shackle 13.

Final harvesting of the surrounding meat from the poultry leg 17 takes place at the driven carrousel 21 and the last cutting station 35. Next, the bone is discarded from the shackle hook 19. From there the shackles return to the first shackle resetting station 5A. Before or after the first shackle resetting station a knuckle expeller may be placed for expelling knuckles of broken legs from the hooks.

As described above, in a modified variety of the example, the J-cutter 9 section is arranged to not adjust the height of the knee joints of all legs to be substantially the same.

Figure 22B:
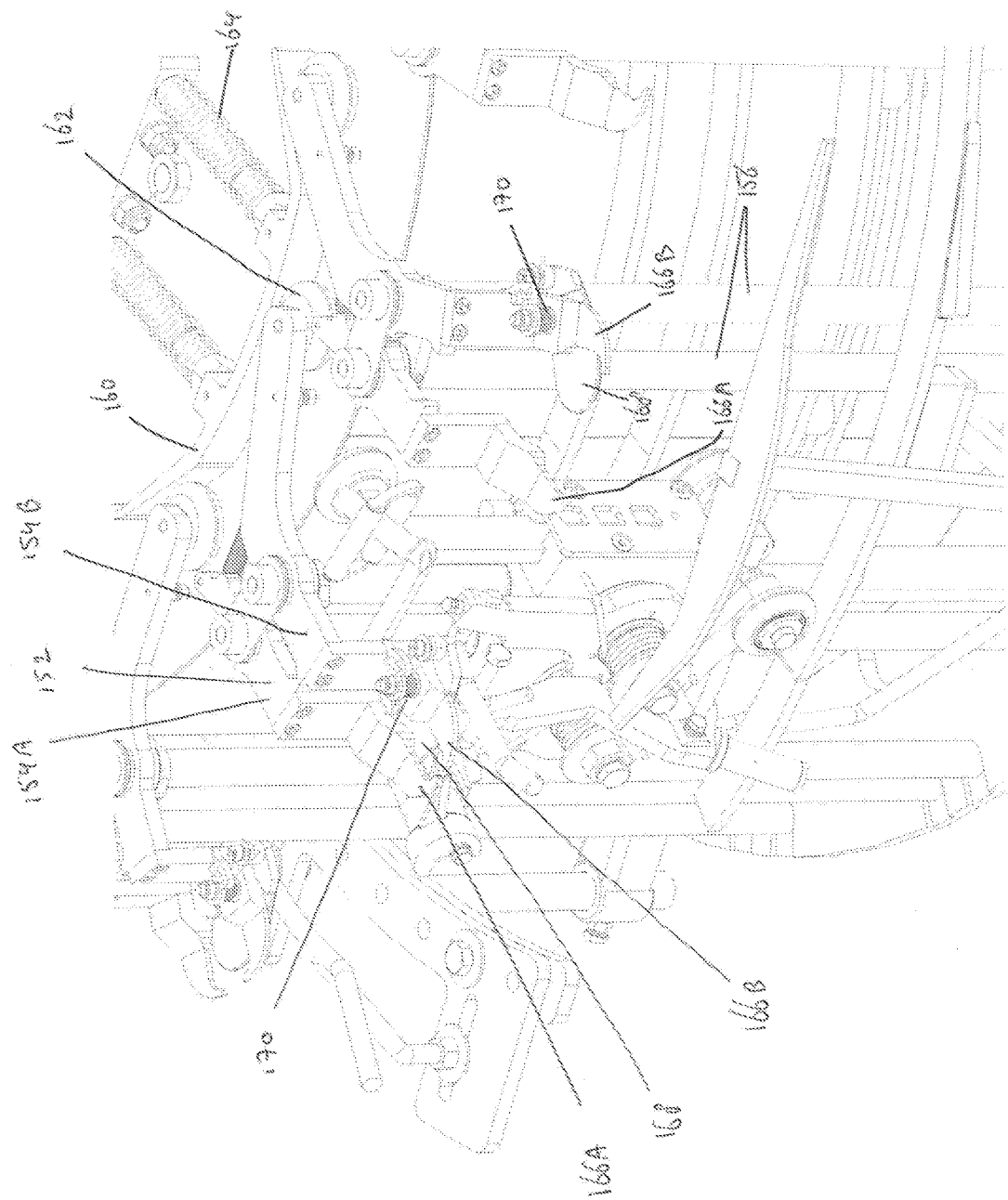
FIG. 22B is a partial view of a knuckle support unit and J-cutter.

FIGS. 22A and 22B show an example of a knuckle support unit 150 for a J-cutter section 9. The knuckle support unit 150 includes a plurality, in this example sixteen, knuckle supports 152. Each knuckle support 152 includes a first arm 154A and a second arm 154B. The arms are pivotally attached to a frame. In this example, the arms 154A, 154B are pivotally attached to shafts 156 of the J-cutter. In this example, pivotal motion of the two arms 154A, 154B of a knuckle support 152 are coupled, such that both arms spread and close simultaneously. In this example, thereto the arms 154A, 154B include meshing gear teeth. Here, the arms 154A, 154B are biased into an open, spread position, here by a resilient element such as a spring 158.

The knuckle support unit 150 further includes a guide 160. It will be appreciated that an angular position of the guide 160 around a rotation axis of the J-cutter 9 here determines timing of the opening/closing of the arms 154A, 154B. At least one of the arms, here arm 154B, includes a cam, such as a roller, 162. The cam is arranged to contact the guide 160. Then the guide 160 pushes the cam 162 and consequently the arms 154A, 154B are pivoted to a closed position. As can be seen in FIG. 22A, the guide 160 is spring-loaded 164, such that if the cam exerts excessive force onto the guide 160, the guide will be moved out of position against spring 164 force.

The arms 154A, 154B include grippers 166A, 166B, respectively. Further, to at least one of the arms, here arm 154B, a pressure plate 168 is mounted. The pressure plate 168 is pivotally connected to the arm 154B. Here, the pressure plate is biased outwardly, away from the axis of rotation of the J-cutter 9. Here the knuckle support 152 thereto includes a spring 170. Hence, when the grippers 166A, 166B close around a leg, the pressure plate 168 will be pushed backwards by the leg, against the biasing force, over a distance depending on the thickness of the leg. Hence, the leg is firmly gripper by the grippers 166A, 166B.

The knuckle support unit can be operated as follows. At the position around the carrousel where the legs meet the knuckle support 152 to be gripped by, the arms 154A, 154B are in the open position. After a certain rotation of the carrousel, the knuckle support 152 is closed so as to grip the leg with the grippers 166A, 166B and the pressure plate 168. As described above, the closing is effected by the guide 160. Once the arms are in the closed position the leg is gripped by, but can slide longitudinally with respect to the grippers 166A, 166B. Then, the J-cutter 9 can incise the leg. In this example, the grippers 166A, 166B are aligned with the knife of the J-cutter such that the grippers are straight above the knife. Hence, the knife always incises the leg at the desired position just behind the bone (and not touching the bone). After the J-cutter has made the incision, the arms 154A, 154B are moved to the open position and the leg can be removed.

It will be appreciated that the knuckle support unit 150 can also be used in other machines than the machine described herein. For example, the knuckle support 150 can be used in conjunction with a J-cutter in an alternative poultry processing machine.

Accordingly there is described a method of, and an apparatus 1 for, continuously harvesting surrounding meat from a successive plurality of animal legs 17 having articulated first and second animal bones and an intermediate joint. The method continuously conveys the animal legs 17 through a path of conveyance, and determines a location of the intermediate joint. Based on the determined location of the intermediate joint, adjusting a position of the intermediate joint and a cutting implement 135 relative to one another, and performing cutting of tissue at a location commensurate with the location of the intermediate joint. The step of determining the location of the intermediate joint is performed contactless, and without interrupting continuous conveyance of the animal legs.

It is thus believed that the operation and construction of the present invention will be apparent from the foregoing description and drawings appended thereto. Reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

In the examples, the poultry legs suspended from the hooks include both a drumstick and a thigh. It will be appreciated that the described methods and machines can also be applied with only drumsticks suspended from the hooks. It will be clear that the number and/or layout of the cutting implements, guide track and/or turning members of the meat stripper section can be adjusted for the purpose of deboning a drumstick only. It will be appreciated that the described methods and machines can also be applied with only thighs suspended from the hooks. It will be clear that the shape of the hooks and the number and/or layout of the cutting implements, guide track and/or turning members of the meat stripper section can be adjusted for the purpose of deboning a thigh only.

In the examples, the meat stripper section strips the meat from both the lower leg and the upper leg of the poultry leg suspended from the hook. It will be appreciated that it is also possible that the meat stripper section only strips the meat from the thigh bone, while leaving meat attached to the lower leg. It will be appreciated that thereto the selective tendon cutter unit may be omitted or deactivated. It will be appreciated that it is also possible that the meat stripper section only strips meat from the lower leg while leaving meat attached to the thigh bone.

For the purpose of clarity and a concise description features are described herein as part of the same or separate embodiments, however, it will be appreciated that the scope of the invention may include embodiments having combinations of all or some of the features described. References to published material or sources of information contained in the text should not be construed as concession that this material or information was part of the common general knowledge in this country or abroad. Each document, reference or patent publication cited in this text should be read and considered by the reader as part of this text, and for reasons of conciseness the contents thereof is not repeated, duplicated or copied in this text. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprise', 'comprising' and 'including' when used in this description or the appended claims should not be construed in an exclusive or exhaustive sense but rather in an inclusive sense. Thus expression as 'including' or 'comprising' as used herein does not exclude the presence of other elements, integers, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. Method of continuously harvesting surrounding meat from a successive plurality of animal legs having articulated first and second animal bones and an intermediate joint, the method includes:
   continuously conveying the animal legs through a path of conveyance;
   determining a location of the intermediate joint;
   based on the determined location of the intermediate joint, adjusting a position of the intermediate joint and a cutting implement relative to one another; and
   performing cutting of tissue at a location commensurate with the location of the intermediate joint,
   wherein the step of determining the location of the intermediate joint is performed without interrupting continuous conveyance of the animal legs.

2. Method of claim 1, wherein the determining the location of the intermediate joint is performed contactless.

3. Method of claim 2, wherein the contactless determining of the location of the intermediate joint is performed using electromagnetic radiation.

4. Method of claim 2, wherein continuous conveyance of the animal legs comprises the animal legs each being suspended from a shackle that is moved through a path of conveyance by an overhead conveyor, wherein the shackles are aligned with one another at a common level prior to the step of contactless determining of the location of the intermediate joint, and wherein the level of each shackle is adjusted individually based on the determined location of the intermediate joint to align all intermediate joints at a common level.

5. Method of claim 4, wherein prior to the step of contactless determining of the location of the intermediate joint the shackles are reset to a predetermined standard height to become aligned with one another at a common level.

6. Method of claim 1, wherein the position of the intermediate joint is adjusted to be aligned with the cutting implement.

7. Method of claim 1, wherein the animal legs are continuously moved through a path of conveyance, and wherein determining the location of the intermediate joint is performed while shielding the path of conveyance against electromagnetic radiation.

8. Method of claim 1, wherein cutting of tissue at the location commensurate with the location of the intermediate joint comprises gripping the surrounding meat, moving the suspended bone away from the gripped surrounding meat to tension and expose tissue for cutting.

9. Method of claim 8, wherein the step of cutting tissue commensurate with the location of the intermediate joint is repeated on at least two surrounding sides of the animal leg.

10. Apparatus arranged for performing the steps of claim 1.

11. Method of claim 1, wherein the electromagnetic radiation includes X-ray.

12. A method of harvesting surrounding meat from an animal leg having articulated first and second animal bones and an intermediate joint, with the animal leg suspended from a shackle, the method comprising:
    determining a location of the intermediate joint using electromagnetic radiation;
    adjusting a position of the intermediate joint with a cutting implement; and
    performing cutting of tissue at a location commensurate with the location of the intermediate joint.

13. Method of claim 12, wherein the electromagnetic radiation comprises X-ray.

14. Apparatus for harvesting surrounding meat from an animal leg having articulated first and second animal bones and an intermediate joint, comprising:
    a conveyor system arranged for continuously conveying the animal legs through a path of conveyance past a determination unit and a cutting implement;
    the determination unit being arranged for determining a location of the intermediate joint using electromagnetic radiation;
    the cutting implement being arranged for cutting of tissue at a location commensurate with the location of the intermediate joint and;
    an adjuster arranged for adjusting a position of the intermediate joint relative to the cutting implement.

15. Apparatus according to claim 14, wherein the determination unit comprises an X-ray detection unit.

16. Apparatus according to claim 15, wherein the X-ray detection unit comprises a housing arranged such that the animal leg can pass through the housing, and that X-ray radiation is prevented from exiting from the housing.

17. Apparatus according to claim 16, wherein the housing comprises doors for allowing the animal leg to enter and exit the housing.

18. Apparatus according to claim 17, wherein the doors are revolving doors.

19. Knuckle support unit comprising:
    a plurality of knuckle supports, each knuckle support comprising a first arm and a second arm, the first and second arms being movable relative to each other from an open to a closed position, the first and second arms being movably mounted to a movable carrier;
    a guide, being positioned to remain fixed while the knuckle supports pass the guide;
    at least one of the first and second arms comprising a cam arranged to contact the guide, such that upon contacting the cam, while the cam passes the guide, the guide moves the cam such that the arms are moved to the closed position;
    each the first arm and the second arm comprising a respective gripper, arranged such that the grippers of a knuckle support together can grip an animal part.

20. Cutting station for cutting meat on a poultry leg depending from a shackle, the cutting station being arranged for cutting the leg at a position adjustable in height relative to the shackle, wherein the cutting station comprises an inclined guide for guiding the shackle forwards and upwards or downwards, and the cutting station further comprises a motion unit for moving the knife in a forward and/or backward direction.

21. Apparatus according to claim 14, comprising a knuckle support unit according to claim 19.

22. Knuckle support unit according to claim 19, wherein motion of the two arms of a knuckle support is coupled, such that both arms open and close simultaneously.

23. Knuckle support unit according to claim 19, wherein the first and second arms are biased into an open, spread position, such as by a resilient element such as a spring.

24. Knuckle support according to claim 19, wherein to at least one of the first and second arms of a knuckle support a pressure plate is mounted.

25. Knuckle support according to claim 19 wherein the guide is biased in its position such that if the cam exerts excessive force onto the guide, the guide will be moved out of position against a biasing force.

26. Knuckle support unit according claim 19 mounted to a J-cutter unit, for holding poultry legs by an ankle knuckle or a knee knuckle.

27. Knuckle support unit according to claim 26, wherein the grippers are aligned with a knife of the J-cutter unit such that the grippers are above the knife.

* * * * *